(12) United States Patent
Levine

(10) Patent No.: US 8,190,463 B2
(45) Date of Patent: *May 29, 2012

(54) SYSTEM AND METHOD FOR MANAGING MOBILE WORKERS

(75) Inventor: Kenneth M. Levine, New Smyrna Beach, FL (US)

(73) Assignee: Masterlink Corporation, Orlando, FL (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/334,561

(22) Filed: Dec. 15, 2008

(65) Prior Publication Data

US 2009/0150209 A1 Jun. 11, 2009

Related U.S. Application Data

(63) Continuation-in-part of application No. 11/845,968, filed on Aug. 28, 2007, now Pat. No. 7,487,106, which is a continuation of application No. 09/656,393, filed on Sep. 6, 2000, now Pat. No. 7,283,971.

(51) Int. Cl.
*G06Q 10/00* (2012.01)
(52) U.S. Cl. ..................................................... 705/7.13
(58) Field of Classification Search ................ 705/7.13, 705/9
See application file for complete search history.

(56) References Cited

U.S. PATENT DOCUMENTS

| | | | |
|---|---|---|---|
| 5,189,606 A | 2/1993 | Burns et al. | 364/401 |
| 5,249,120 A | 9/1993 | Foley | 364/401 |
| 5,343,387 A | 8/1994 | Honma et al. | 364/401 |
| 5,369,570 A | 11/1994 | Parad | 364/401 |
| 5,408,663 A | 4/1995 | Miller | 395/650 |
| 5,873,124 A | 2/1999 | Draves | 711/202 |
| 5,913,201 A | 6/1999 | Kocur | 705/9 |
| 5,943,652 A | 8/1999 | Sisley et al. | 705/9 |
| 6,070,144 A | 5/2000 | Ginsberg et al. | 705/9 |
| 6,233,493 B1 | 5/2001 | Cherneff et al. | 700/95 |
| 6,278,978 B1 | 8/2001 | Andre et al. | 705/9 |
| 6,484,036 B1 | 11/2002 | Sorkin et al. | 455/508 |
| 6,535,883 B1 | 3/2003 | Lee et al. | 707/100 |
| 6,571,215 B1 | 5/2003 | Mahapatro | 705/8 |
| 6,578,005 B1 | 6/2003 | Lesaint et al. | 705/8 |
| 6,725,428 B1 | 4/2004 | Pareschi et al. | 715/530 |
| 7,283,971 B1 | 10/2007 | Levine et al. | 705/9 |
| 2001/0047287 A1 | 11/2001 | Jacobs et al. | 705/9 |
| 2001/0049619 A1 | 12/2001 | Powell et al. | 705/9 |
| 2001/0051890 A1 | 12/2001 | Burgess | 705/9 |
| 2002/0026342 A1 | 2/2002 | Lane et al. | 705/8 |
| 2002/0065700 A1 | 5/2002 | Powell et al. | 705/9 |

FOREIGN PATENT DOCUMENTS

| | | |
|---|---|---|
| EP | 0 658 841 | 10/1994 |
| WO | 00/41104 | 7/2000 |

OTHER PUBLICATIONS

Lesaint, D. et al., "Dynamic Workforce Scheduling for British Telecommunications PLC," Interfaces, Institute of Management Sciences, vol. 30, No. 1, Jan.-Feb. 2000, pp. 45-56.

Smith, J. et al., "Process Plan Generation for Sheet Metal Parts Using an Integrated Feature-Based Expert System Approach," Institute of Electrical Engineers, Database Accession No. 4175738, Abstract, 1 page.

*Primary Examiner* — Andre Boyce
(74) *Attorney, Agent, or Firm* — Allen, Dyer, Doppelt, Milbrath & Gilchrist, P.A.

(57) ABSTRACT

A system manages mobile workers and includes a plurality of clients and a server. A database includes a plurality of target objects that are classified corresponding to facilities assets to be worked on by a mobile worker and attributes of each target object, including any tasks to be performed on target objects. A rule engine maps from a problem space for partitioned jobs and mobile workers to a solution to schedule jobs and mobile workers in selected different regions. The rule engine is operative to control the scheduling algorithm using heuristics comprising at least one of a tabu search, iterated local search, guided local search, and variable neighborhood search to focus a search space to regions for moving the schedules of high utility.

20 Claims, 20 Drawing Sheets

DEPTH FIRST SEARCH

BREADTH FIRST SEARCH

SYSTEM AND METHOD FOR MANAGING MOBILE WORKERS

RELATED APPLICATION(S)

This application is a continuation-in-part of U.S. patent application Ser. No. 11/845,968 filed Aug. 28, 2007, now U.S. Pat. No. 7,487,106, which is a continuation of Ser. No. 09/656,393 filed Sep. 6, 2000, now U.S. Pat. No. 7,283,971 issued Oct. 16, 2007, the disclosures which are hereby incorporated by reference in their entirety.

FIELD OF THE INVENTION

This invention relates to facilities management, and more particularly, this invention relates to managing workers.

BACKGROUND OF THE INVENTION

Patent application Ser. No. 11/845,968 discloses a system and method for managing mobile workers. A plurality of clients each correspond with a mobile worker to be managed. Each client includes a communications device for receiving messages detailing work schedules for tasks to be performed as jobs on target objects in a job environment. A server is in communication with each of the plurality of clients. The server includes a database having a plurality of target objects that are classified corresponding to facilities assets to be worked on by a mobile worker, and attributes of each target object, including any tasks to be performed on target objects.

The server includes a rule engine operative for determining algorithms based on a utility function for partitioned jobs and mobile workers. Different algorithms are selected and used for different partitions to schedule jobs and mobile workers in selected different regions. An algorithm is selected based on a weighted sum that is calculated from a possible number of work schedules, jobs and mobile workers for each partition. A selected policy for a job environment determines how mobile workers, jobs and work schedules are partitioned. The server includes a plurality of system agents that automate supervision, including work planning, scheduling, dispatching, stores management job statement management and end-of-shift management. A communications device is operative with the server for communicating calculated work schedules and jobs as messages to the clients.

Some scheduling algorithms, such as a round robin and rescheduling algorithm, are set forth. It is advantageous that some constraints could be used to direct a scheduling, (e.g., a rescheduling) algorithm.

SUMMARY OF THE INVENTION

A system manages mobile workers and includes a plurality of clients and a server in communication with a plurality of clients. The server includes a database having a plurality of target objects that are classified corresponding to facilities assets to be worked on by a mobile worker and attributes of each target object, including any tasks to be performed on target objects. A rule engine is operative with the scheduling algorithm to map from a problem space for partitioned jobs and mobile workers to a solution to schedule jobs and mobile workers in selected different regions. The rule engine is operative to control the scheduling algorithm using heuristics comprising at least one of a tabu search, iterated local search, guided local search, and variable neighborhood search to focus a search space to regions for moving the schedules of high utility. A communications device is operative with the server for communicating any determined schedules and jobs as messages to clients.

These clients each include a communications device for receiving messages detailing work schedules for tasks to be performed as jobs on target objects in a job environment. The server includes a database having a plurality of target objects that are classified corresponding to facilities assets to be worked on by a mobile worker, and attributes of each target object, including any tasks to be performed on target objects.

A selected policy for a job environment determines how mobile workers, jobs, and work schedules are petitioned. The server includes a plurality of system agents that automate supervision including work planning, scheduling, dispatching, storage management, job state management and end-of-ship manager. The rule engine is operative to control the scheduling algorithm using the heuristics.

In one aspect, the tabu search is operative to prevent searching recently explored portions of the search space. The iterated local search perturbates a solution for a new solution as a starting value for another scheduling algorithm. The guided local search perturbates a utility function to penalize sub-optimal components of a solution. The variable neighborhood search can perturate a neighborhood search to be used in the next iteration.

In another aspect, the scheduling algorithm is operative with numerical and combinatorial constraint objects allowing searching from a general search to a more specific search. A constraint object can maintain time usage of a constraint object.

The server can include a simulator database and simulation module that queries the simulation database to determine the effects of a policy change on planning and scheduling of jobs and workers using different algorithms and petitions and can include an event bus.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

The embodiments will now be described more fully hereinafter with reference to the accompanying drawings, in which preferred embodiments of the invention are shown. Other aspects may, however, be embodied in many different forms and should not be construed as limited to the embodiments set forth herein. Rather, these embodiments are provided so that this disclosure will be thorough and complete, and will fully convey the scope to those skilled in the art. Like numbers refer to like elements throughout.

Figure 1:
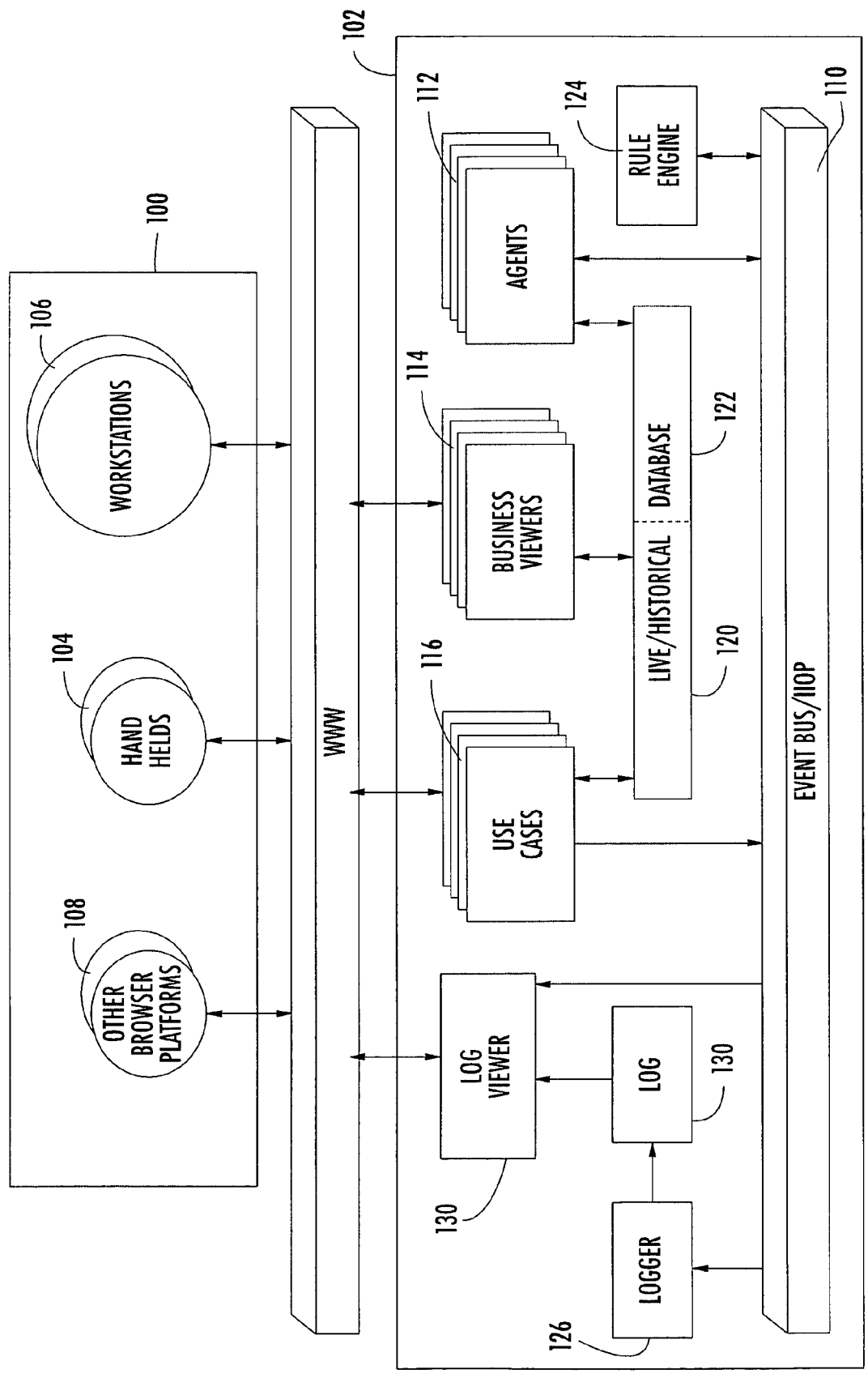
FIG. 1 illustrates a general overall block diagram of the system showing the interconnection among the various components of the present invention.

For purposes of description, there follows an overview of the system, giving a high level description of basic components and their interaction. The system, in one aspect, is a web-based client/server application developed to manage the activities of skilled mobile workers (FIG. 1). The server contains all information regarding work to be done, who will perform the work, and the rules (policies) governing their implementation and interactions. The system can be used on a hand-held computer or PC workstation on a LAN. The system provides a remote worker with all relevant task information via a full or part-time telecommunications link, such as via a hand-held web based device.

For purposes of a non-limiting explanation of this system description, work is reduced into four major components:

1) Targets—Anything you aim to work on, e.g., a piece of equipment.

2) Tasks—The collection of actions to be taken, e.g., Task=Service Air-handler, Action=Lube Motor Bearing. Tasks have attributes such as skill required, estimated time, and material needed.

3) Workers—The human resources capable of completing the desired task. Workers have attributes such as skill, skill level (grade), schedule availability.

4) Jobs—Collections of tasks applied to targets and assigned to workers.

The different components of the system as described below can be defined and can operate on the principle of these four major relationships. The system architecture provides a consistent set of application interfaces that follow the natural process flows within each subsystem.

In accordance with one aspect, there are some basic foundation components that are used to solve the common problems of a facilities management domain.

The system is built on an implementation of a recognized numbering scheme. Many schemes can be used. AN example is the specification from the Construction Specifications Institute (CSI), which forms the foundation for architectural drawings. This foundation is composed of four components, which are described as follows:

1) Master Format Classification—Classifies what something is. For example: An Indoor Air-handler unit is part of the Mechanical System; is part of the Heating, Ventilating; and is part Air Conditioning Equipment Subsystem; is part of the Air Handling Units Subsystem Group; and is described as a Component called Indoor Air-handler. Thus, an Indoor Air-handler (or any piece of equipment) is classified for all facilities in the same manor. This completely removes any ambiguity relative to describing things that will be managed by the system.

2) Data Definition—Describes generically what attributes a classified object will have. It includes such things as Design Data (how it is expected to perform), Generic Manufacturing Data Form (make, model, etc.). For example: An Indoor Air-handler will have Design Data such as CFM, coil type/size, motor type/size, etc. This is also where external data requirements, such as OSHA requirements, are recorded. Additionally, this is where Tasks are defined. Tasks are a finite set of actions, based upon target classification. The system of the present invention provides a complete set of tasks for a given classification, and provides the facilities for any users to add more as desired. Data Definitions make up one component of Policy as described below.

3) Data Specification—This is where specific data about a particular Indoor Air-handler is recorded through the system interface. For example: Air-Handler #20 is in Building One, Floor 10, Room 1015. It is supposed to produce 10,000 CFM, has a 2 pass chilled water coil, it has a 15 horsepower motor, it has a GE Motor Model number 15 CCM, 230 volts, 3 phase. The data requirements have already been defined, so the user need only populate the "templates" provided. A user may add more data elements as desired.

4) Process Knowledge—The system of the present invention has embedded the process knowledge used in the basic supervisory functions for work management, including: Planning, Scheduling, Dispatching, Stores Management, Project Management, and Supervision (called Job State Management), and others. Process knowledge is the ability to make specific decisions relative to the function being managed. For example: When the Planner is deciding if a Task is due to be run, it must first determine the last time it was run and evaluate whether or not enough time has elapsed to make it eligible to be planned (used in a job). The system makes the link between the definition, the data, and the business logic needed to automate the decision making process.

Figure 17:
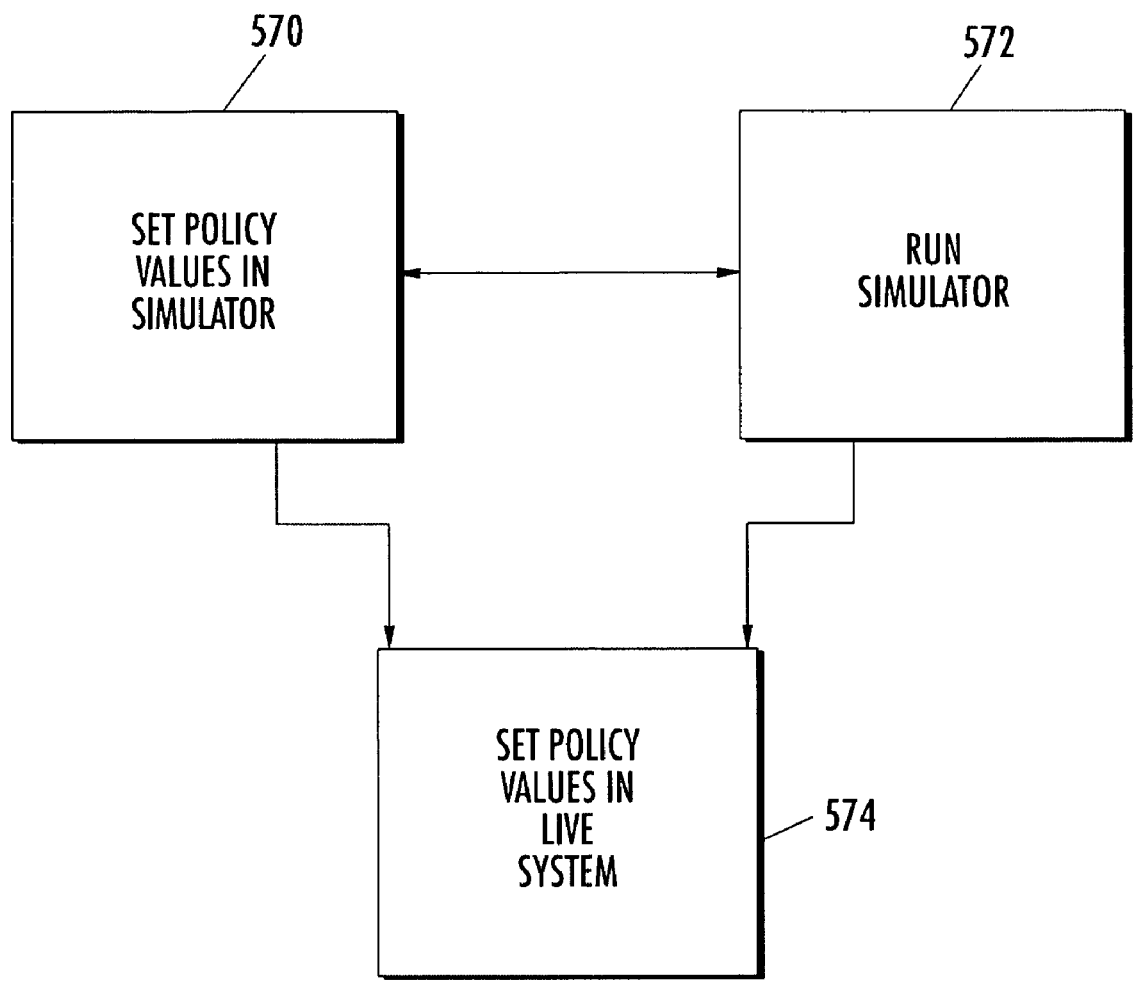
FIG. 17 is a block diagram illustrating the inter-relationship between the policy database, the simulator, and the system agents.

The system product, built on the above foundational components, enables customers that use the invention to execute a continuous loop of operational improvements. This loop has three aspects to it: (1) Process; (2) Policy; and (3) Prediction Through Simulation as shown in FIG. 17. Those three aspects can be explained as follows:

I. Process

The system defines process as the collective system activities that cover all aspects of worker management. It begins with a system-generated request for work (planning), and ends when a Job is completed. This involves, among other things, moving a Job (a collection of tasks for a target) through various states (points in its life-cycle) until it is completed. When a job has been created by the system it has a state called a Pending Job Order (PJO). The system evaluates all policies and, if policies are satisfied, moves the job in a job state transition to the next state, called Ready for Scheduling (RES). For example, if a policy contained within a policy database on the server says that a job cannot be RFS unless the earliest start date is equal to or greater than today (the date of the evaluation), then the job is not moved to RFS. If that condition and all other conditions related to the STATE RFS are met, then the job is moved to RFS. That Process, and all others, are completely controlled by Policy contained in a policy database and implemented by system agents.

II. Policy

The system defines Policy as all of the definitions, rules, and business factors that control the behavior of the different system agents, which in turn, controls the managed workers. Examples of three types of policy elements include:

A. Definitions—If the tasks defined for a particular target are changed, then the mobile worker is affected. If the frequency for a task is changed from monthly to weekly, then the demand for labor resources is increased.

B. Rules—If the system is planning for tasks with a frequency of quarterly, then the system also plans for all frequencies less than that (monthly, weekly, etc.).

C. Business Factors—These elements directly affect how workers are scheduled, and how costs are accounted for. If a level five electrician is doing level three work, then the system tracks the "skill premium" i.e., the difference paid between the minimal skill required vs. the actual skill delivered. By adjusting the weight of this type of factor, users can minimize negative costs by weighting a given factor heavily. That will force the system to minimize skill premium occurrences.

III. Prediction Through Simulation

The system includes an intelligent work management simulator that provides management the capability to visualize the effect of proposed changes in business policy (work force usage, energy management, stores etc.) on business indicators, such as labor costs and energy savings. After policy values have been (temporarily) changed, planning and scheduling may be run and the results examined Then, the work force's response to these scheduled tasks is estimated, based on their characteristics (workers, tasks, and their interdependencies). These results are then translated into business-meaningful knowledge that the manager can use to determine whether the proposed new policy values should be accepted, modified or rejected.

System Agents

An example embodiment uses a plurality of system agents to automate supervision, which includes work planning, scheduling, dispatching, stores management, job state management, and end-of-shift management. These system agents provide computer representations of functions normally fulfilled by people in an organization. The agents behavior is based on policy. This characteristic makes the agents totally configurable in user-customized ways. Management then has the ability to instantaneously respond to changing conditions, and maximize worker productivity with the assurance that policy decisions are implemented the same way each and every time.

A planner agent inventories all items requiring work, and determines the tasks to schedule, the skills required to complete the tasks, and material needed. For example, it looks at equipment records to determine which ones are due for service. The planner agent uses customer-established policy to decide if all criteria (such as time, cycles, etc.) have been met. When management's rules determine that the criteria were met, the agent creates a job.

A schedule agent matches skill resources with the demands of the job and creates a proposed schedule. The rules governing this agent concern the issues of location, skills, time needed, and similar requirements. Once this agent's evaluation is complete, the job is placed on a worker's schedule for further processing.

A dispatcher agent is responsible for tracking the location and status of the workforce. When orders are added to a resource's schedule, the dispatcher agent will determine, based upon priority rules, if the worker should be interrupted or be allowed to finish the current assignment. In addition, the dispatcher "knows" what methods to use to contact the worker. For example, if the worker's handheld computer does not respond to messages, the agent may then call the pager number.

A job state manager agent maintains the state of all active jobs. When system events occur, this agent evaluates rules determining which jobs, if any, should transition to a new state, and what the new state of each job is. For example, when the scheduler finishes running, scheduled jobs are typically transitioned out of Request For Scheduling (RFS) to one of the post-scheduling states, such as scheduled pending dispatch (SPD).

A stores agent is responsible for making sure the necessary materials required for a job are available. If the materials are not available, the store's agent will notify an operator that a purchase must be made in order to complete the job. The store's agent will continue to check for the availability of the material and, when it arrives, allow the job to be scheduled.

An end-of-shift agent evaluates all jobs that were placed on work schedules and not completed. For example, it will determine (among other factors), based on Policy, whether or not to give the job to another worker or reschedule the job to the same worker the next time that worker is on shift.

A project manager agent coordinates the flow of a project, which is defined as two or more jobs created for related purposes. For example: Project=Move Wall; Jobs include: 1) Disconnect Electric, 2) Remove Drywall & Studs, 3) Repair Flooring. Each may require a different skill, and may require sequential execution. In this example, the project manager agent will ensure that Job 1 is completed before Job 2 can be scheduled. This agent will facilitate management of sophisticated inter-job dependencies.

Other agents can also be included as necessary for system operation. Other policy agents can be used for performing tasks as required by those skilled in the art.

Business viewers are used as a portal into the system and allows users to follow a chronological flow in the system from the perspective of targets, workers jobs or agents. For example: To answer the question, "What did the Scheduler Agent do yesterday?", users will be able to select an Agent tab of a graphical user interface (GUI), the date, and "drill down" to find all the activities the agent performed and what the results were for that agent. In the case of the scheduler, a user could find out how many times the scheduler ran, how many jobs the scheduler evaluated, how many schedules were created, and how well those schedules can be rated for overall effectiveness (called utility).

All of the database changes made by the system Use Cases (user interactions with the system) and system Agents are reflected in a database system known as the intelligent work management history database. This data warehouse will be navigated by using business viewers. Users can view summary information about a whole class of targets (types based upon Master Format Classification), or information about individual targets (objects). These tools may also be used to produce historical reports for any date/time period. These tools are the primary means of viewing the historical performance of the workforce.

A user may navigate the web of business objects, going from class to class or object to object, following the natural business associations reflected in the data (e.g., a worker has a work schedule, the work schedule has jobs, each job has job tasks, each task is for a target). This can be referred to as the "space" the objects live in. The navigation tools (business viewers) also allow the user to move around in time and space, navigating the historical operation of the work force, producing reports focused on the space and time slice in which they are interested.

One embodiment is especially advantageous because it allows simulation of facilities management by copying the live database for simulation. The simulator provides management the capability to visualize the effect of proposed changes in business policy (work force usage, energy management, stores etc.) on business indicators, such as labor costs and energy savings. After policy values have been (temporarily) changed, planning and scheduling may be run and the results examined. The work force's response to these scheduled tasks is estimated, based on their characteristics (workers, tasks, and their interdependencies). These results are translated into business-meaningful knowledge that the manager can use to determine whether the proposed new policy values should be accepted, modified or rejected.

Using the simulator does not change the value of any policy data in the "live" system. That is, the live system continues to run unaffected by any changes made in the simulation database. To effect this, the live data is copied into a simulation database when the simulator starts. Caching techniques are used to predefine the table headers, to make the simulation start up procedure timely.

The typical use of the simulator is to determine the effects of a policy change on the results of planning and scheduling. Although the pattern of use can vary, one pattern can operate as follows:

1. Set the values of one or two rules or factors (differential test of the value of that rule/factor(s).

2, Run the planning and scheduling agents. (This includes running the simulated worker schedules to completion for each shift.)

3. Use the business viewers to examine the differential impact of the new policy settings.

4. If the new settings are not acceptable return to step L.

5. Persist the final policy settings to the live system (optional).

6. Exit the simulator.

Other uses would include:

a) Differential setting of a business object, such as an attribute of a task or a target definition and simulation of the direct effect of planning and scheduling with the new settings.

b) Adding a worker or a target and examining the effect of planning and scheduling with the new worker or target.

c) Major changes, such as adding a third shift of workers.

The Simulator can display a screen that is used to control the simulation process. The actual inspection of results is explained in the following section, "viewing simulations". The simulation use case presents one screen with a number of choices for the user. The user is prompted to name the simulation and provide a description of its raison d'être, and is provided with the following capabilities:

1. Simulate X days agent processes. This includes the following:

a) Run the Planner. The planner is run in the simulated world, followed by the job state manager.

b) Run the scheduler and the scheduled jobs. For each shift during the planning horizon.

c) Jobs are scheduled.

d) The job state manager is run to transition the job state.

e) Dispatchable jobs are "run." The worker simulation agent determines the disposition of each scheduled job.

f) The project manager is run to prepare the jobs that are now eligible to be run.

g) The end of shift agent is run to determine the fate of any unfinished jobs (if any).

h) The start of shift agent is run to prepare the initial work schedules for the next shift.

2. Reinitialize. Rolls back the registry and all jobs to their initial state (that is, as they were at the beginning of the simulation).

The following steps three (3) and four (4) are not necessary steps, but could be followed.

3. Roll back planned and scheduled work. All jobs created by the planner are removed. All jobs that existed at the beginning of the simulation are returned to their initial state. Similar to "reinitialize" except all changes to the registry are preserved.

4. Persist the registry. Normally, all changes made in the simulation are invisible in other simulations or the "real world". This command allows the user to propagate all registry changes from the simulated world to the real world.

5. End the simulation. The simulation will be captured as a cluster of database records, for post-simulation viewing with the Business Viewers.

The Business Viewers are the main tool used to view the results of the simulations. The Business Viewers do not distinguish between the live system and simulated worlds. Instead, the run on the appropriate database and report results accordingly. A user may open N windows, each of which may point at a time and location in any world. This allows users to view one or more time points in a given simulation, compare two simulations or a simulation and the real world, and so forth.

Future plug-ins into the log viewer will allow a context-based comparison of results. The delta in the registries for two worlds will be displayed along side the comparison of values in corresponding log nodes for the two worlds.

Referring now to FIG. 1 there is illustrated an overview of the architecture and showing a facility at block 100 with various types of user operating stations that interconnect to the server 102 via a telecommunications link, such as the worldwide web of the internet. The mobile operators use hand-hand mobile devices 104, workstations 106 and other browser platforms 108S which interconnect such as by a telecommunications link, with the server 102 and its various components, which communicate via an event bus 110. The basic components of the system include a plurality of system agents 112 as described above, business viewers 114 that are coupled with one business viewer application and a plurality of Use Cases 116 that define user interaction with the computer. The system agents 112, business viewers 114 and Use Cases 116 are interoperative with live and historical databases 120, 122. The system agents and Use Cases also interact with the event bus, which also interacts with a rule engine 124 that is stored as a program within the server. The event bus also interacts with a logger 126 and log viewer 128, which both interact with the log database 130.

Figure 2:
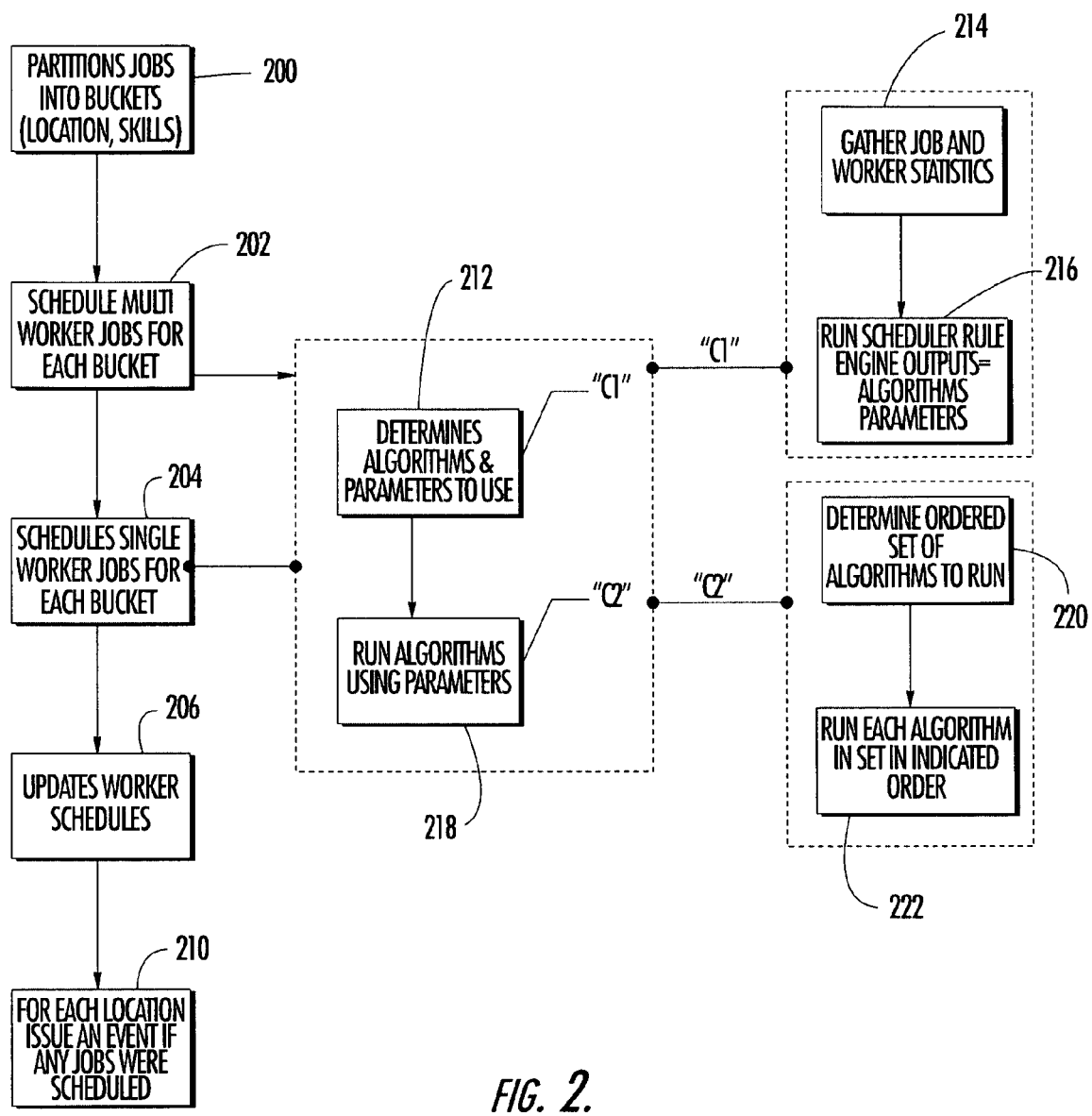
FIG. 2 is a flow chart illustrating the scheduling agent.

FIG. 2 illustrates the basic flow chart of the scheduler system agent. As identified, at block 200, jobs are petitioned into buckets based on such attributes as the job's location and skill requirements. Multi-worker jobs are scheduled for each bucket (block 202) and single worker jobs are scheduled for each bucket (block 204). Worker schedules are updated (block 206) and for each location, an event is issued if any jobs were scheduled (block 216).

The algorithms and parameters to use are determined when the multi-workers and single workers are scheduled (block 212). At this point, it is possible to gather job and worker statistics (block 214), and then run a scheduler rule engine that outputs the algorithm and parameters to be used to schedule that set of jobs to those workers (block 216). After the algorithms are determined, the algorithms are run using the output parameters (block 218). An ordered set of algorithms to run are determined (block 220), and for each algorithm to be run, it is set in the indicated order (block 222).

Figure 3:
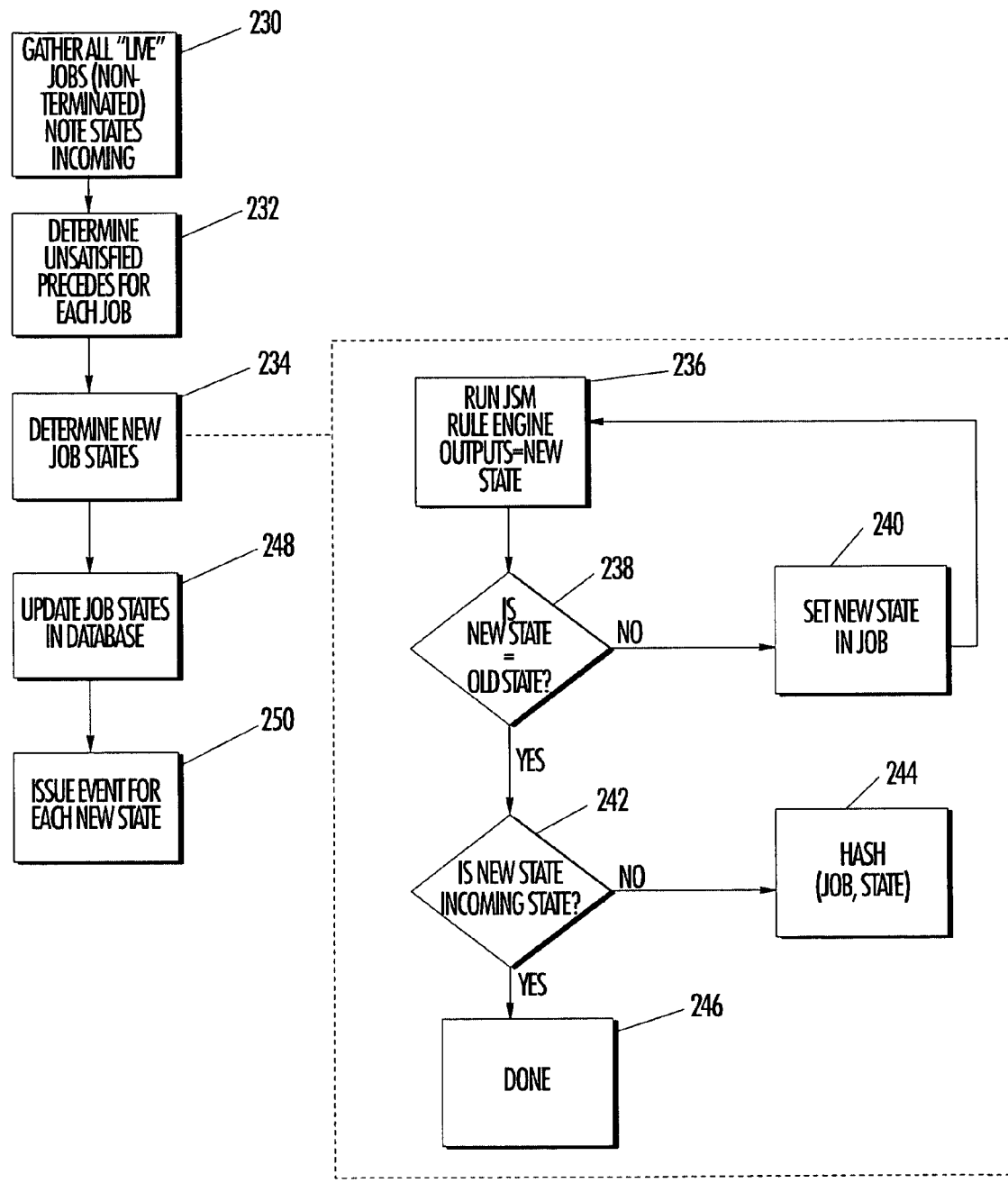
FIG. 3 is a flow chart illustrating the job state manager agent used for controlling other system agents.

FIG. 3 illustrates a job state manager agent. As illustrated, the job state manager will gather all "live" jobs (non-terminated) where the different states that are incoming are noted at (block 230). The unsatisfied procedures are determined for each job (block 232). New job states are determined (block 234). At this time, the job state manager rule engine is run and the outputs equal the new states (block 236). A determination is then made whether a new state equals the old state (block 238). If it is not, then the new state is set in the job (block 240), and the rule engine runs again. If the new state equals the old state, then a determination is made whether a new state is the incoming state (block 242). If it is not, then a HASH function for the job and state is run (block 244). If the new state is the incoming state, then the system is done (block 246), and the job states are updated in the database (block 248). An event is issued for each new state (block 250).

Figure 4:
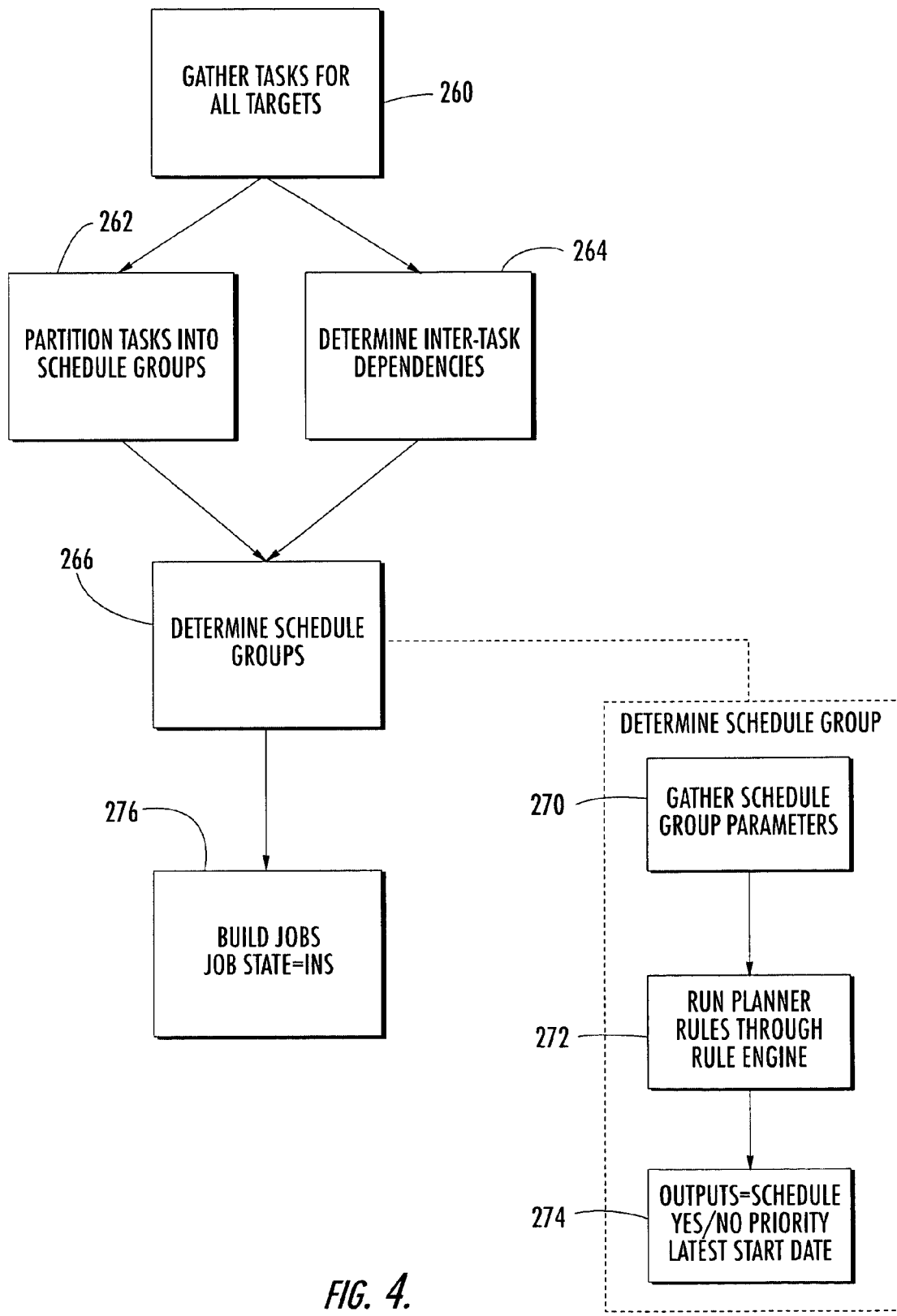
FIG. 4 is a flow chart illustrating the planner agent.

The planner agent is illustrated in FIG. 4. Tasks are gathered for all targets (block 260). The tasks are petitioned into schedule groups (block 262) and the intertask dependencies are determined (block 264). The schedule groups are determined (block 266) and a subroutine run to determine the schedule group (block 268). In the subroutine, the schedule of group parameters are gathered (block 270), and the planner rules are run through the rule engine (block 272). Outputs of the rule engine include, for example, the job's priority and the job's earliest and latest start dates (block 274). Jobs are built and assigned an initial state (block 276).

Figure 5:
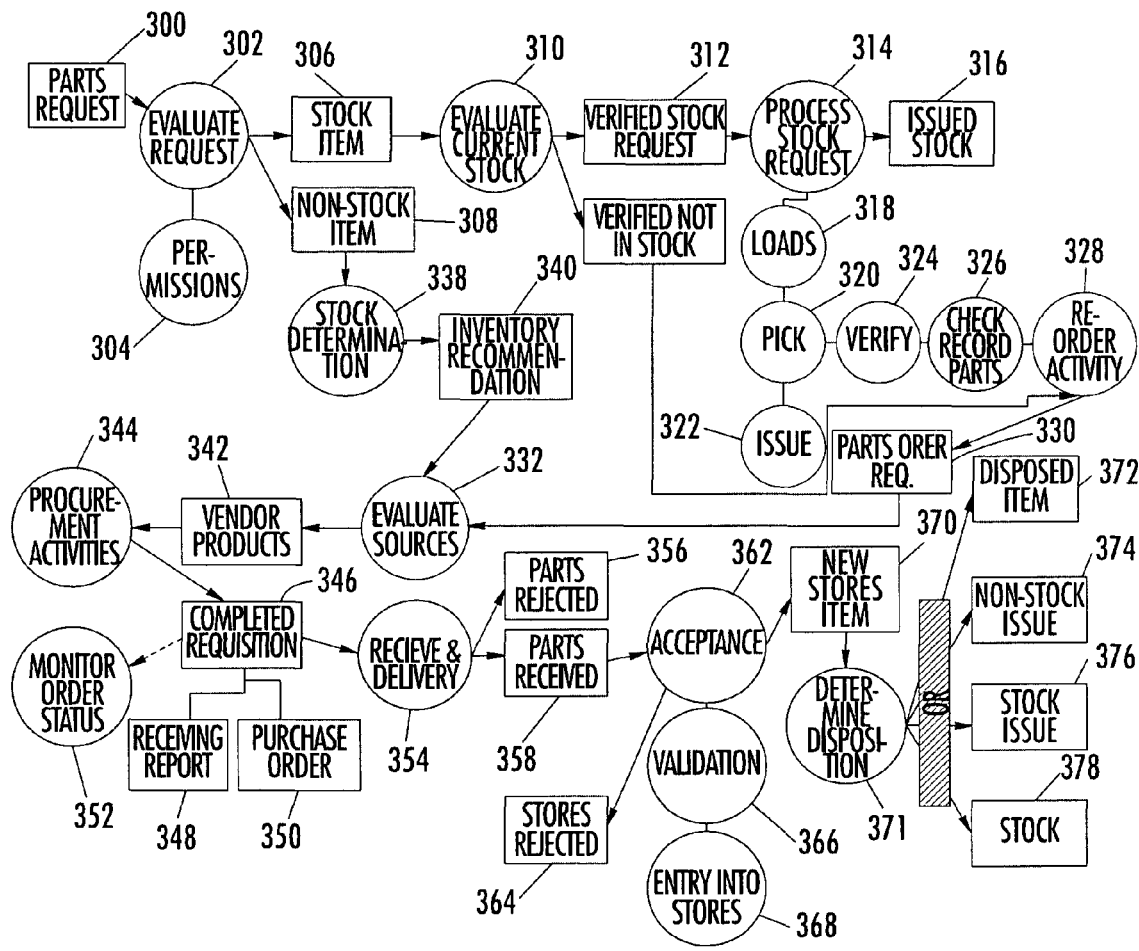
FIG. 5 is a flow chart illustrating the storage agent.

A storage agent is shown in FIG. 5 and illustrates the process flow for determining inventory and the stores. A parts request is first made (block 300) and a request evaluated (block 302). Permissions are determined (block 304). A determination is then made whether it is a stock item (block 306) or a non-stock item (block 308). The current stock is evaluated if it is a stock item (block 310). At this time, if the current stock has been evaluated, the system determines if there is a verified stock request (block 312). If there is, a process stock request is run (block 314) and stock issued (block 316). The system follows a series of steps for loading (block 318), picking and issuing (blocks 320 and 322), and verifying and checking the records and reordering activity (blocks 324, 326, and 328). This also occurs if after the current stock is evaluated, there is not any stock. After the reorder activity, a parts order is requested (block 330) and the sources are evaluated (block 332). This occurs at the evaluate request, when a non-stock item is determined and the stock determination is made with an inventory recommendation (blocks 338 and 340). After sources are evaluated, vendor products are determined (block 342) and procurement activities arranged (block 344). The completed requisition occurs (block 346) with a receiving report and purchase report (blocks 348 and 350). The order status can be monitored (block 352). At the time of a completed requisition, there is a receive and delivery (block 354) with parts rejected (block 356) and parts received (block 358). If parts are received, there is an acceptance (block 362), and possibly, a rejection (block 364), and if not, then a validation (block 366) with an entry into stores (block 368). If it is a new store item (block 370), then the disposition is determined (block 371) and there is a disposed item (block 372), non-stock issued (block 374), a stock issued (block 376), or stock (block 378).

The job state manager agent is the component that makes all state changes in all live jobs. Every job has a state. The job begins in an initial state, as shown in the Job State Transition diagram of FIG. 6. The job begins as an initial state (null state) and looks for proceeds with the waiting for proceeds block. The sequence of job starts is determined by the job state manager's rule set. The job state manager runs the rule engine to determine when to make a transition for different customers and can arrange the state with different orders and make transitions at different times. A typical sequence of job state transitions is as follows: the initial job for a job that has preceding jobs is "waiting for proceeds." This is generally followed by "waiting for stores" (WFS) as the next step, and then once stores are assigned, the job becomes a pending job order. These and other state transitions are shown in the job transition diagram of FIG. 6. This diagram shows the default flow of job states, but individual users can configure job state transitions based on user defined rules and policies.

Figure 7:
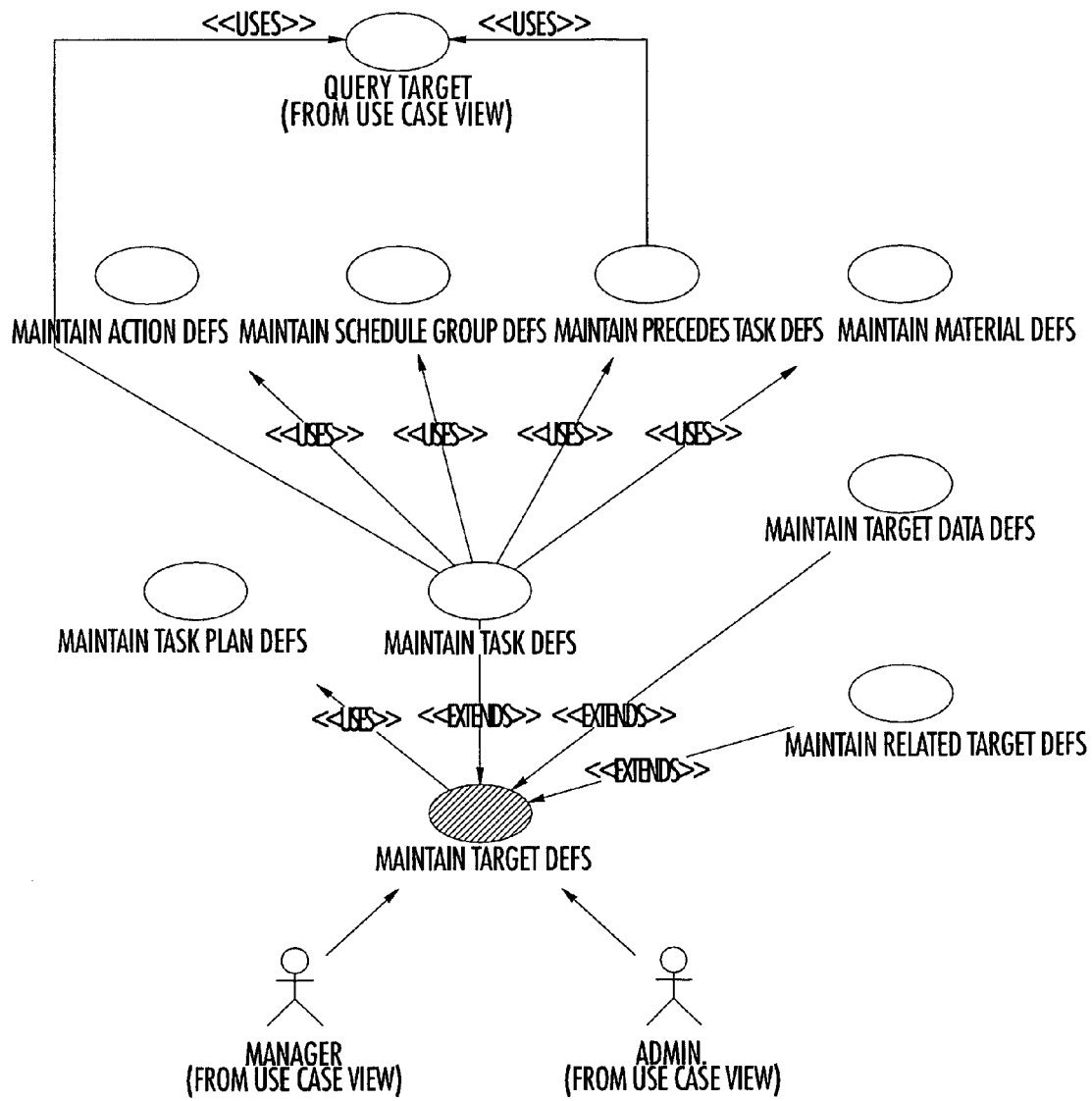
FIGS. 7-11 illustrate flow charts for Use Cases, which show the interaction among human components and the computer.
Figure 8:
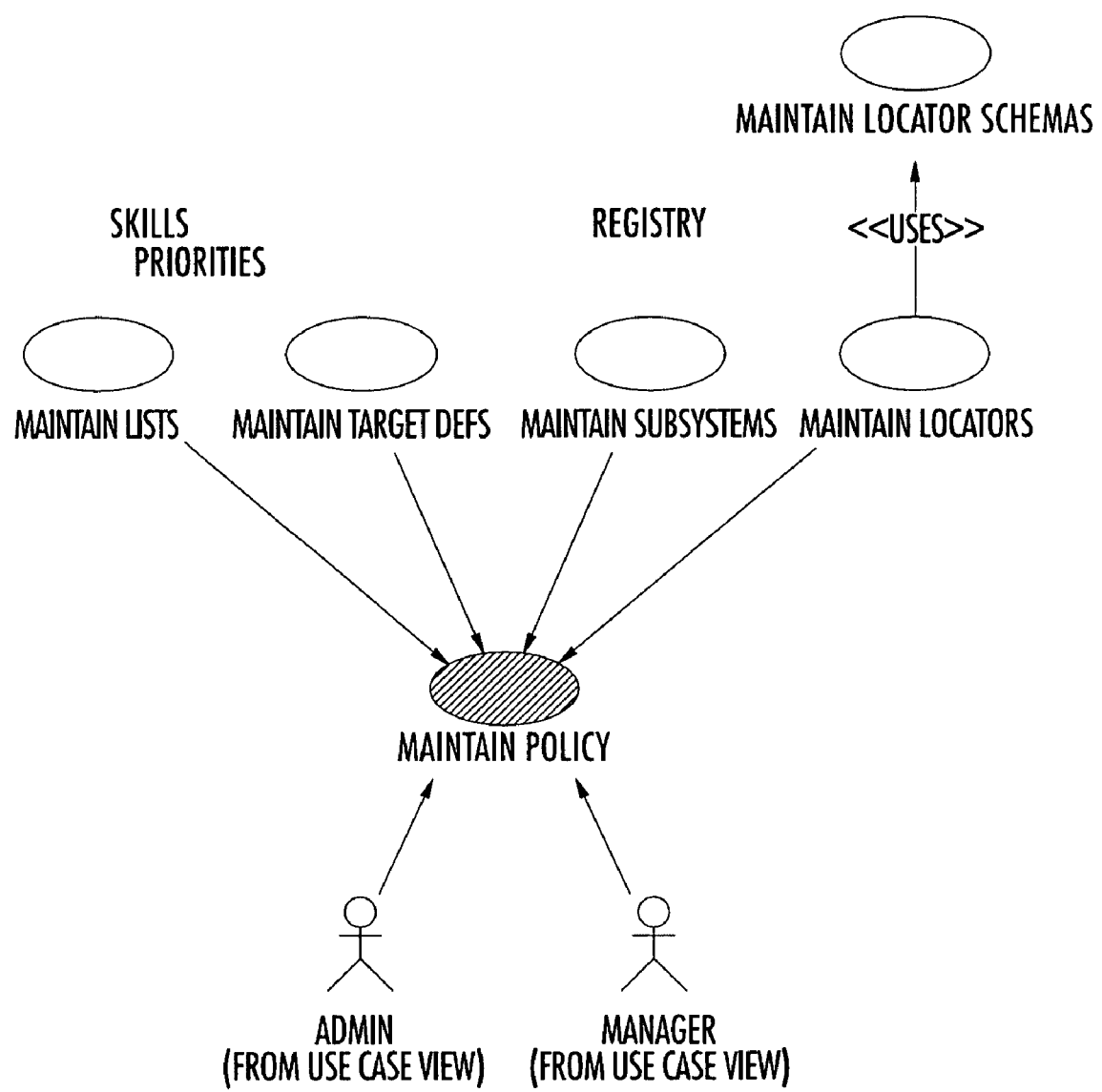
Figure 9:
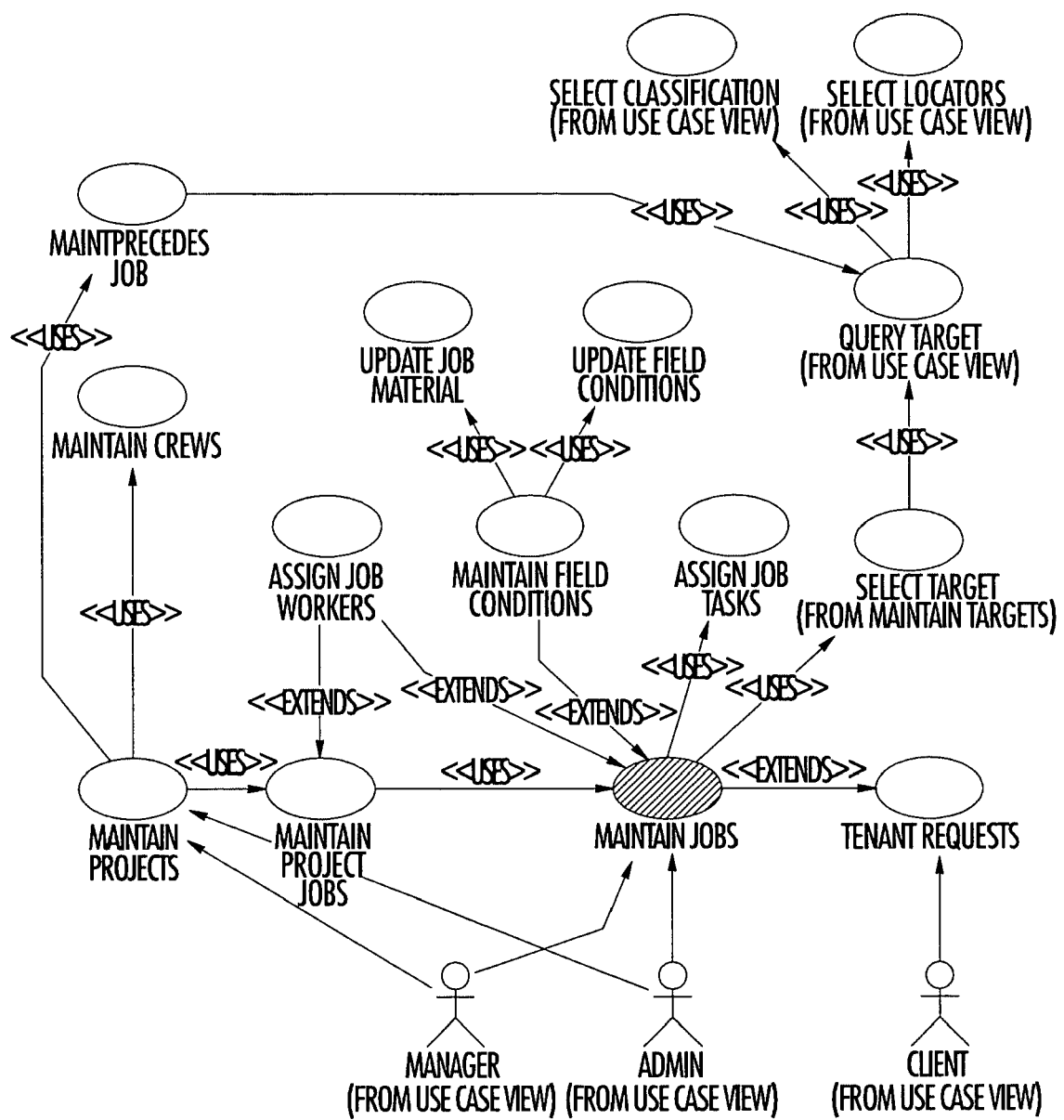
Figure 10:
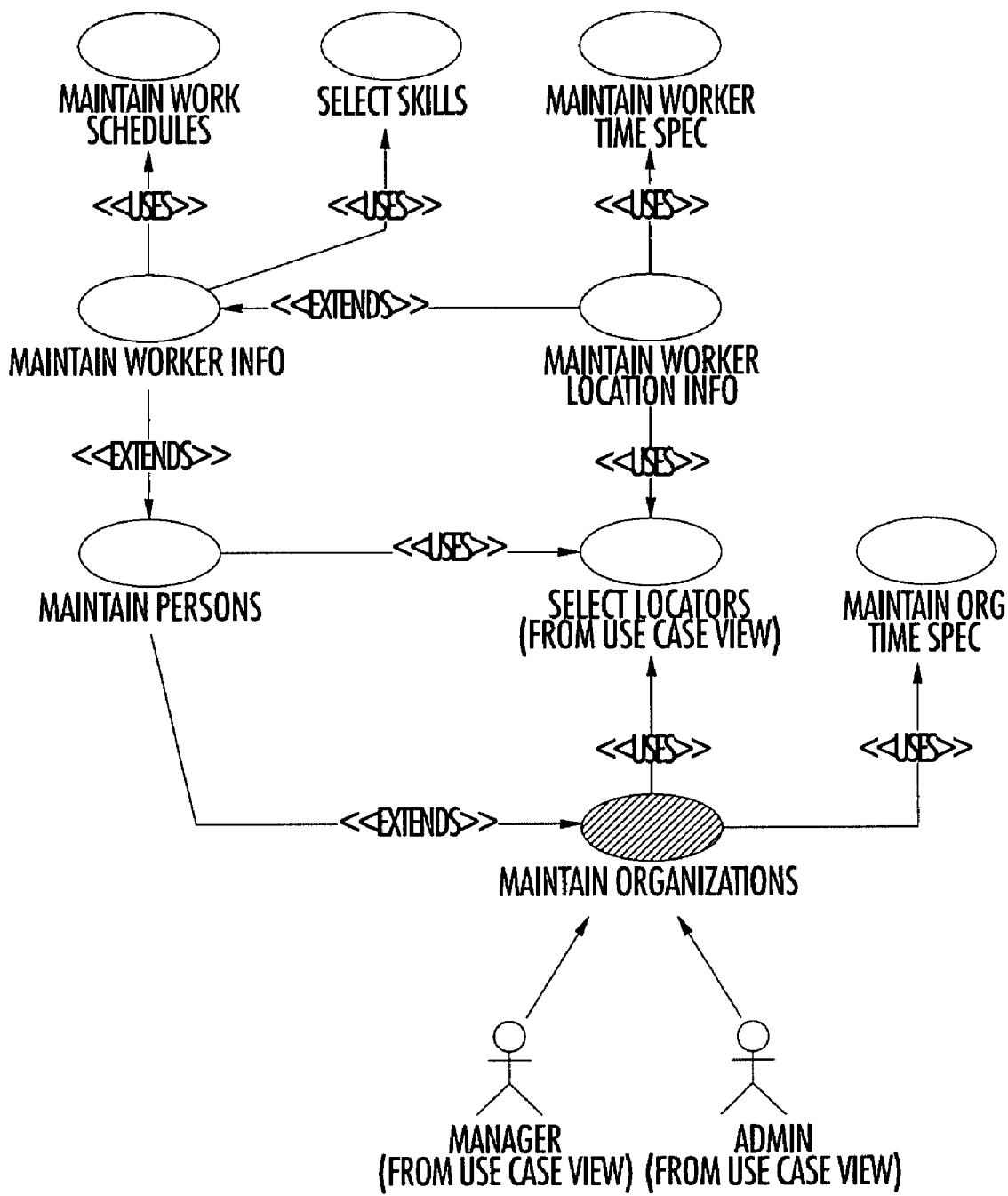
Figure 11:
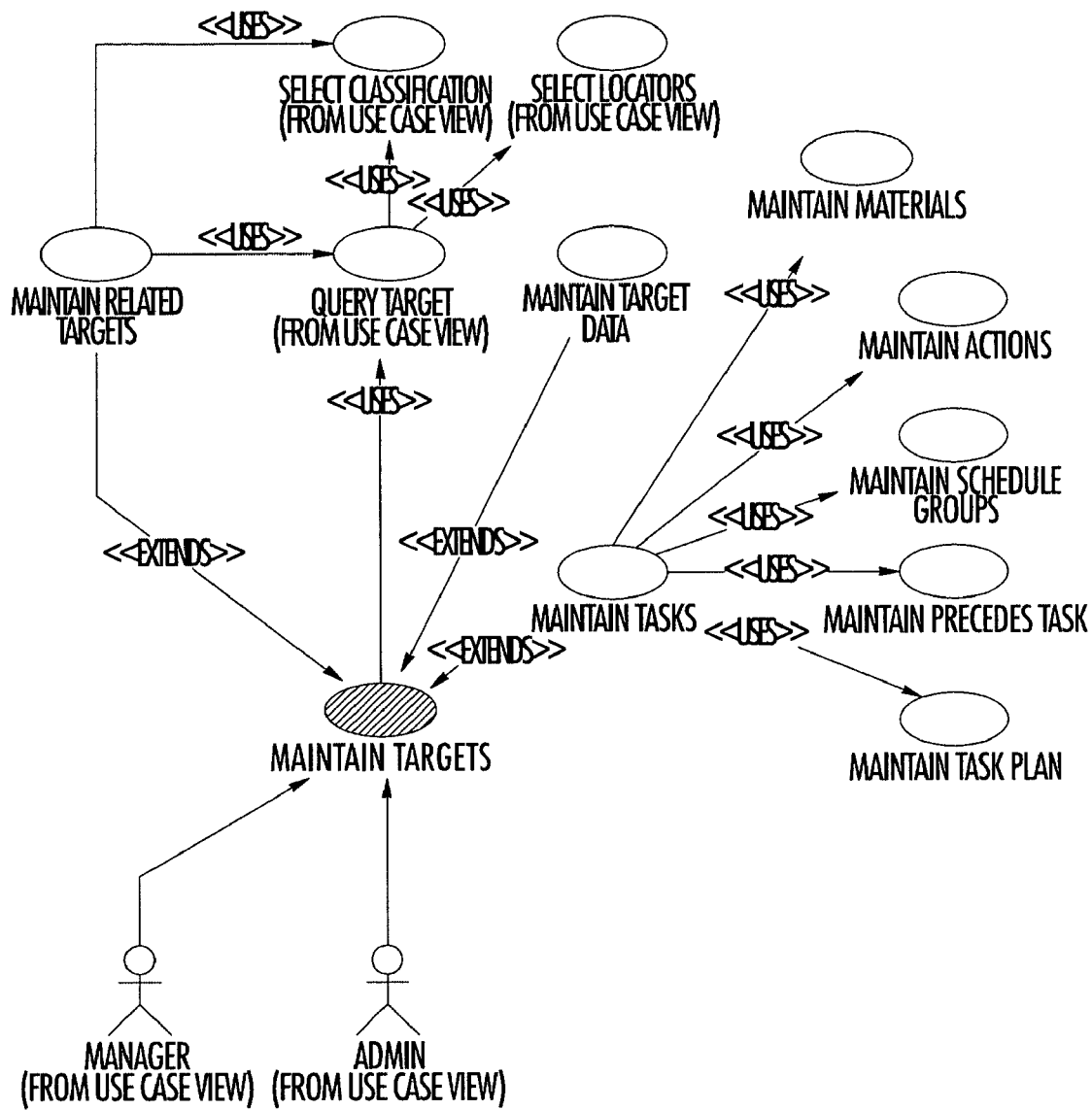

FIGS. 7-11 show various Use Cases where task definitions can be maintained in FIG. 7, and in FIG. 8, the policy definition can be maintained. In FIG. 9, the target definitions are maintained and defined, and in FIG. 10, various worker location information is maintained. In FIG. 11, the targets are maintained. These flow charts show the interaction among computer and user and how definitions and other uses are maintained and selected. FIGS. 12-15 show flow charts for various algorithms.

Figure 12:
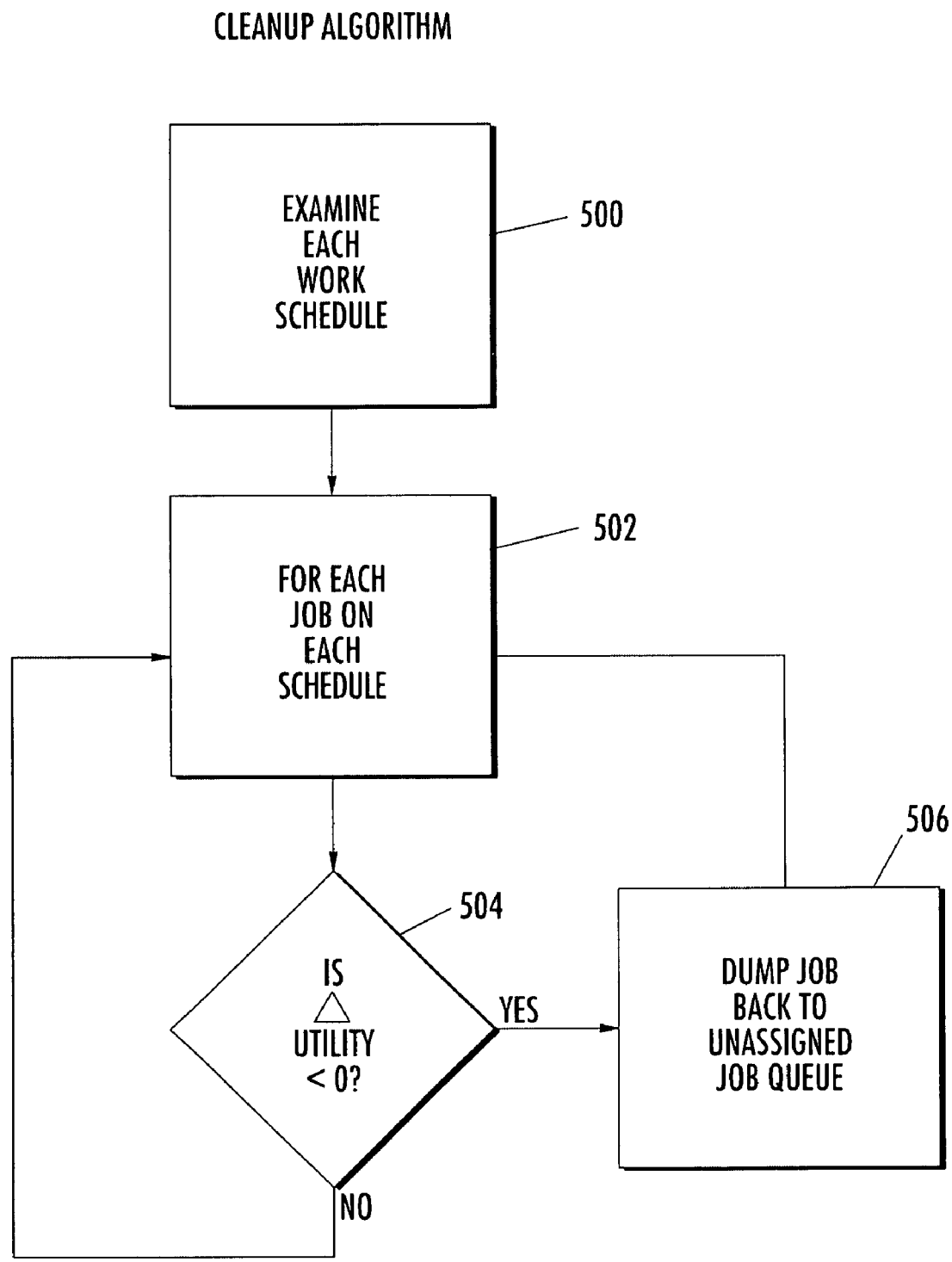
FIG. 12 is a flow chart illustrating a clean up scheduling algorithm.

The clean up scheduling algorithm is set forth in FIG. 12 where each work schedule is examined (block 500). For each job on each schedule (block 502), a determination is made whether the changing utility is less than zero (block 504), and if yes, then the job is dumped back to the unscheduled job queue (block 506). If the changing utility is not less than zero, then the loop starts again.

Figure 13:
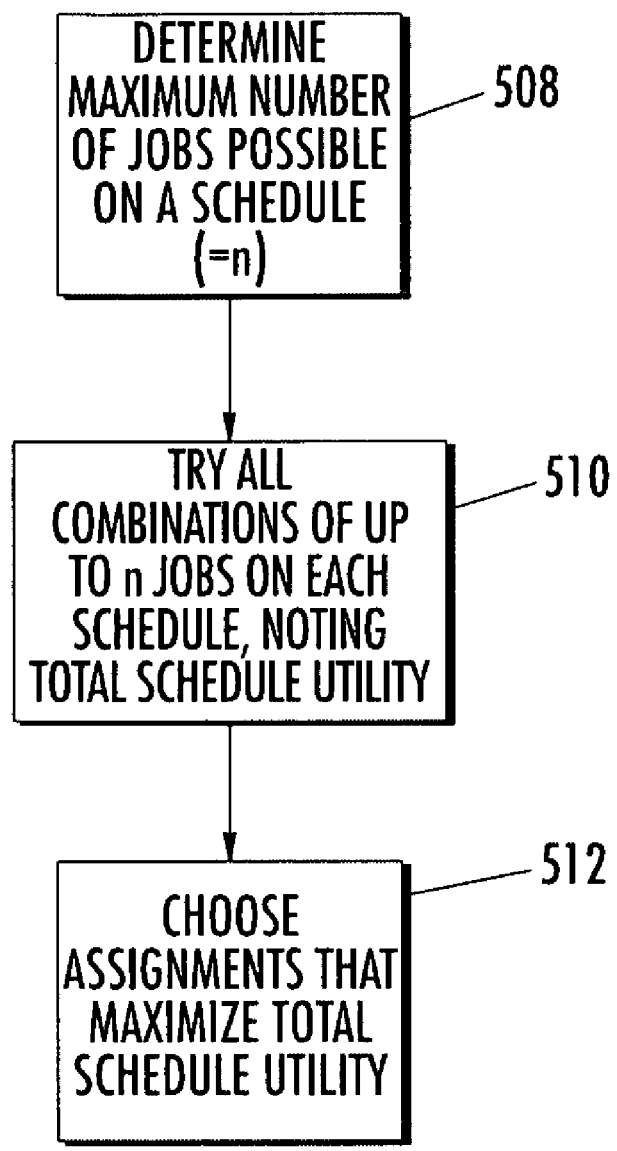
FIG. 13 is a flow chart illustrating a brute force scheduling algorithm.

FIG. 13 shows the basic high level flow chart of the group used for the scheduling algorithm. The maximum number of jobs possible on a schedule equal to n is determined (block 508). All combinations of up to n jobs are tried on each schedule, noting the total scheduled utility (block 510). Assignments are chosen that maximize the total scheduled utility (block 512).

Figure 14:
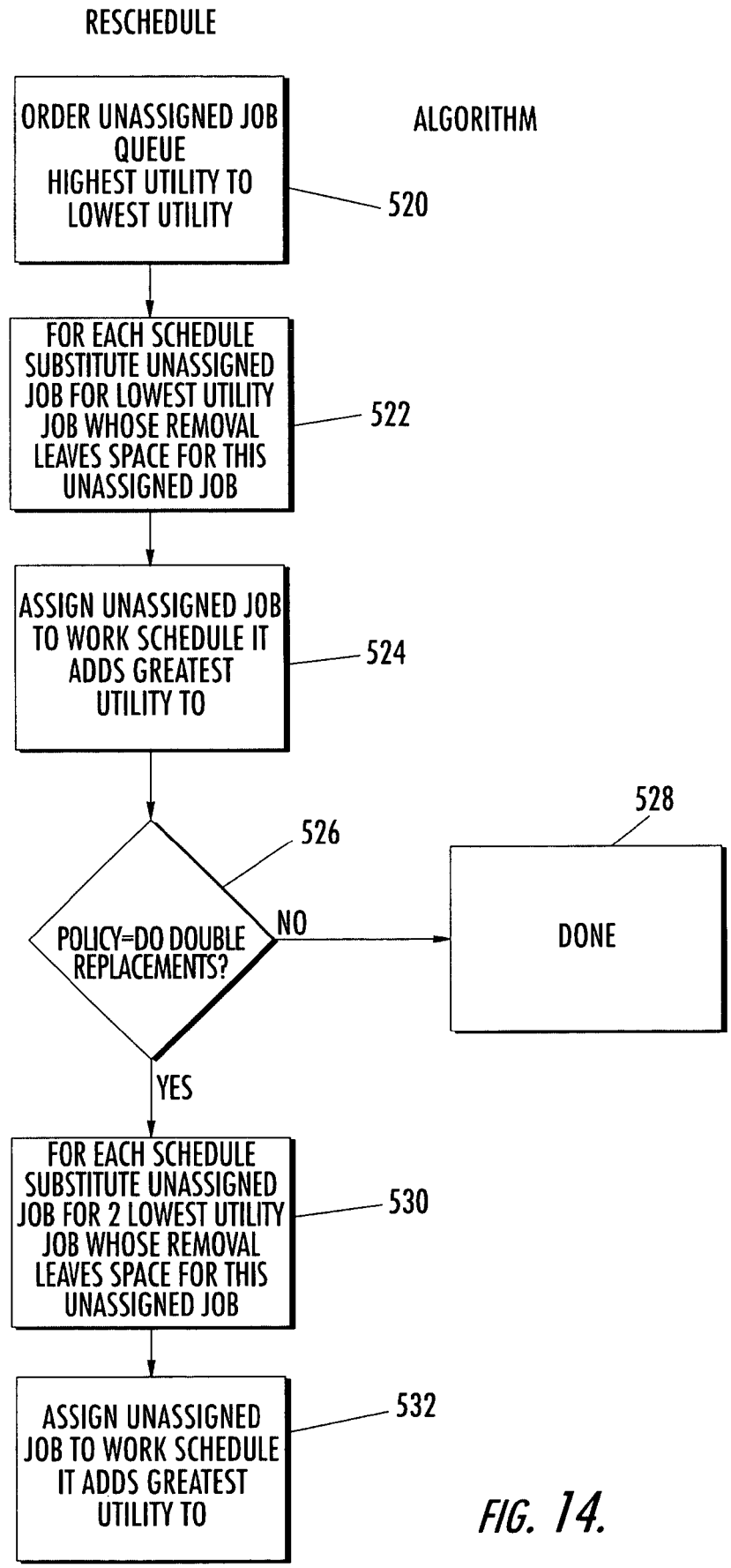
FIG. 14 is a flow chart illustrating a rescheduling algorithm.

The basic concept of the rescheduling algorithm is shown in block format in FIG. 14. The unassigned job queue is ordered from the highest utility to the lowest utility (block 520). For each schedule, the system substitutes the unassigned job for the lowest utility job whose removal leaves space for the unassigned job (block 522). The unassigned job is assigned to the work schedule it adds the greatest utility (block 524). The system determines whether to do double replacements (block 526). If there are no double replacements, then the system is done (block 528). If double replacements are desired, then for each schedule, an unassigned job is substituted for two lowest utility jobs whose removal leaves space for the unassigned job (block 530). Unassigned jobs are assigned to the work schedule and adds the greatest utility (block 532).

Figure 15A:
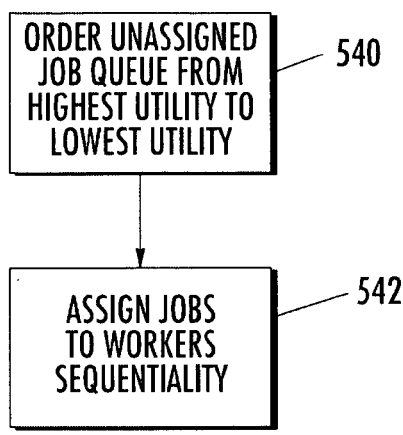
FIG. 15A illustrates a round robin scheduling algorithm.
Figure 15B:
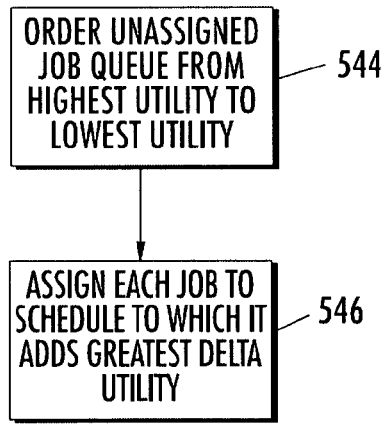
FIG. 15B illustrates a maximal utility scheduling algorithm based on ordering the unassigned job queue from highest to lowest utility.
Figure 15C:
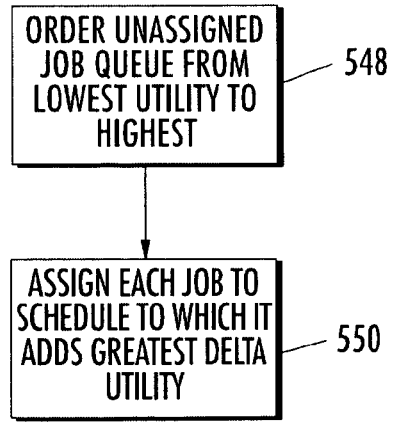
FIG. 15C illustrates a maximal utility scheduling algorithm based on ordering the unassigned queue from lowest to highest utility.
Figure 16:
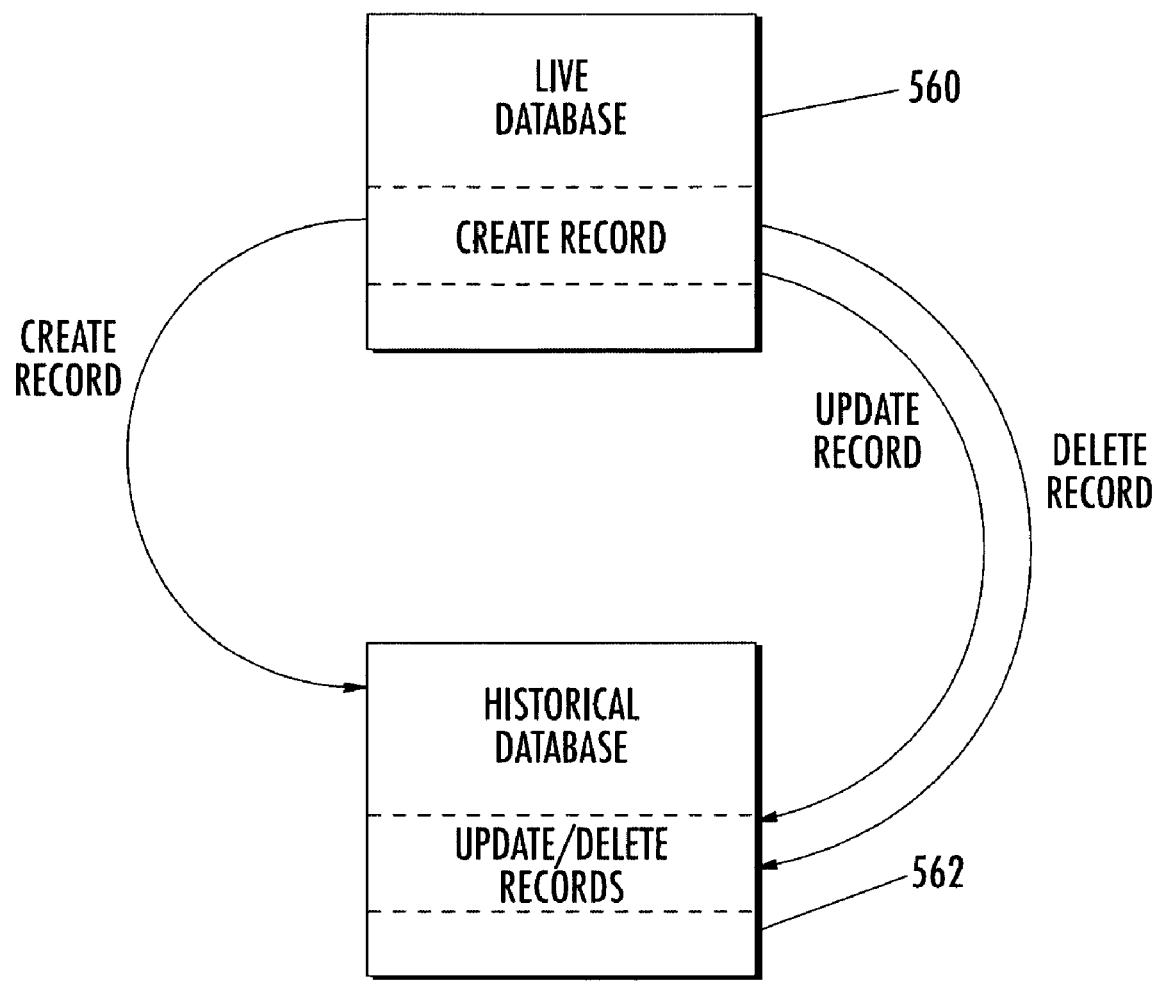
FIG. 16 illustrates the inter-relationship between the live and historical databases.

The primary robin scheduling algorithm is shown in FIGS. 15A-15C. As shown in FIG. 15A in the round robin scheduling algorithm, the unassigned job queue is ordered from the highest utility to the lowest utility (block 540) and then the jobs assigned to the workers sequentially (block 542). FIG. 15B illustrates the utility increasing scheduling algorithm, where the unassigned job queue is ordered from the highest utility to the lowest utility (block 544) and each job is assigned to the schedule to which it adds the greatest delta utility (block 546). FIG. 15C shows the utility decreasing scheduling algorithm. The unassigned job queue is ordered from the lowest utility to the highest utility to the highest (block 548). For each job schedule, it is assigned to the work schedule for which it adds the greatest delta utility (block 550).

Figure 6:
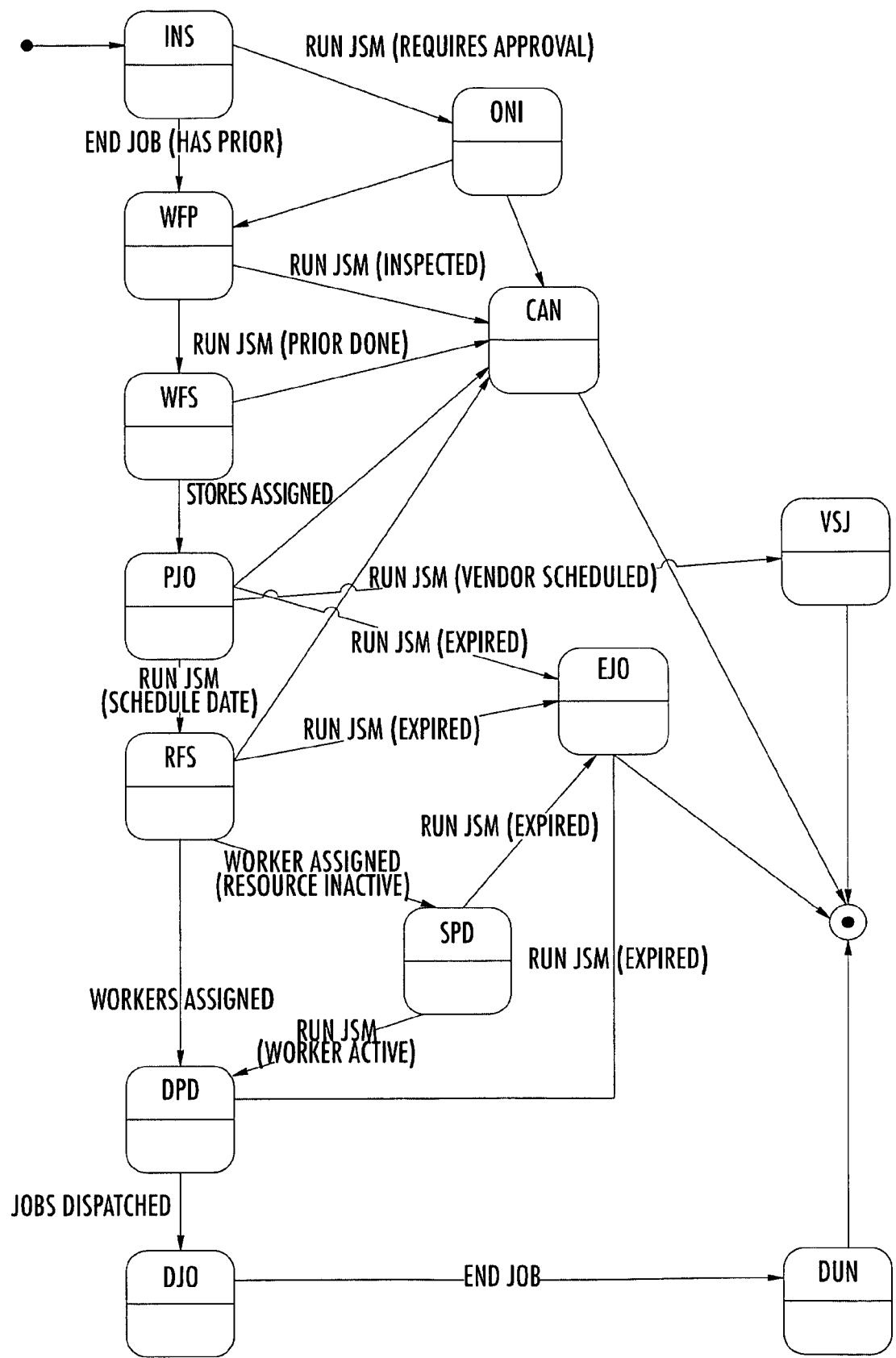
FIG. 6 is a flow chart illustrating an example of a job state transition.

FIG. 6 illustrates the interrelation between the live and historical databases. The live database holds the stored data and uses triggers and stored procedures to create a "create" record, which is recorded in a historical database. Updated records and deleted records are also stored in the historical database 562 as "update" records and "delete" records.

FIG. 17, as explained before, shows a general high level overview of the simulator program. Policy values are set in the simulator (block 570) and the simulator run (block 572). The information obtained is used to set policy values in the live system (block 574).

There now follows a general, high level description of the scheduling process.

For scheduling jobs, the attributes of the problem are used, such as location and skill, to partition the set of jobs and the workers. As a result, the system has several smaller problems to solve. Assumedly, each of the smaller problems is easier to solve than the original larger problem. An example of a partition would be one responsible for scheduling all the electric jobs on a location to the electricians at that location.

For each partition, the system uses a different algorithm to schedule the jobs in that partition to the workers in that partition. For example, the system can try an exhaustive try-all-combinations approach. This might be the best algorithm to use if, for example, there are 1 or 2 workers and perhaps a couple jobs, for example, the plumbers at a location. Other algorithms may prove to be more appropriate for partitions with more jobs and workers.

Partitioning is a process of taking a problem space and dividing it into "regions." In this case, the regions would be defined by the number of workers and the number of jobs for that region. An example might be all the electricians and all the electric jobs at one site. Partitioning results in the assignment of an algorithm and a set of "parameters" to each region. These algorithms are then used to schedule each partition. The result of this activity is a set of schedules for all the jobs and all the work schedules.

Part of this process is a classification problem. This is the assignment of algorithms and parameters to each partition. In support of this effort, experiments were run to determine how well various algorithms run under different parameterizations in different regions of the problem space. For example, for some of these algorithms, using different utility functions lead to different results. The utility function is thus one of the parameters that would be set for an algorithm, based on the characteristics of the problem space for that partition. The idea is to determine which parameter settings are useful in which regions for which algorithms.

The schedule agent treats each (location, skill) combination as a separate (partitioned) problem. It solves this problem using a set of algorithms and parameters that is tailored to the characteristics of that (location, skill) partition, such as the number of workers and the number of tasks for that location and skill.

The scheduler uses the a rule engine to determine the algorithms and parameters used for the particular characteristics of the location and skill partition. Inputs to the rule engine include characteristics of the partition, as well as system- and policy-level information. Outputs include the selection of algorithms and parameters (e.g., k-value) to be used for this location and skill.

The high level scheduling algorithm is thus as follows:

Given: A set of workers with their work schedules either empty or with jobs assigned. A set of jobs, some of which may have already been assigned to the above work schedules.

Produce: An assignment of jobs to work schedules such that all the hard constraints are satisfied for each work schedule. The soft constraints are optimized, based on the average goodness of fit of the schedules.

Algorithm:

1. Use the constraints on jobs being "admissible" for schedules to partition the problem space into regions.

2. Use the rule engine to determine the algorithm and parameters to be used to schedule work of each partition.

3. For each partition, use the rule engine designated algorithm to assign jobs to work schedules for that region.

4. Combine and persist results.

There now follows a general high level example of utility calculation and examples of their use. Naturally, the following description has non-limiting examples that assist comprehension, but are no means limiting.

Each job adds a certain amount of "delta utility" or "marginal utility" to a workers schedule. This is just the overall utility of the work schedule minus the utility of the work schedule consisting of the same tasks minus the job in question. Note that, due to non-linearities in the utility computation (e.g., the effect of non-productive time) the marginal utility of a job will differ from worker to worker. Some of the scheduling algorithms take advantage of this fact during their operation: they tend to assign jobs to the work schedule for which they make the most positive marginal utility contribution.

The scheduling process for a (location, skill) may consist of the use of several algorithms, including a primary algorithm, an optimizing algorithm, and a trim algorithm. These are shown below:

Primary Pass: Attempted to assign each free task to a work schedule with replacement of lower utility tasks weighted sum with k=0.7 Penalizing: grade changes, NPT.

Trim Pass: Remove tasks of negative delta utility from work schedules. Weighted sum with k=0.4 Penalizing: grade changes, NPT.

Primary Pass attempt to assign each free task to a work schedule with replacement of lower utility tasks. This is a description of the algorithm used during the primary pass. The primary pass is used to "fill up" the work schedules with a first approximation of the job assignments leading to maximal utility for these workers.

Weighted sum with k=0.7 Penalizing: grade changes, NPT. This is a description of the utility function used for this algorithm. The utility function in this case is a (weighted) sum of the time on schedule and the prioritized time on schedule. The "k" value is used to mix these two values into the "raw" utility. This raw utility is then modulated by the penalty factors; in this case, ones for grade changes (working under grade level) and non-productive time (NPT).

Optimizing Pass: Attempted to assign each free task to a work schedule with replacement of lower utility tasks. When included, the optimizing pass is an attempt to take high priority jobs on the unassigned job queue (UJQ) and assign them to workers. This sometimes includes displacing tasks that were assigned to the worker during the primary pass, as the assignment of jobs from the UJQ (with displacing, or replacing, tasks) raises the overall utility of the worker's schedule.

Trim Pass: Remove tasks of negative delta utility from work schedules. This is a description of the algorithm used during the trim pass. The trim pass is used to "touch up" work schedules, typically by removing jobs/tasks of negative or very small utility from worker's schedules.

A log file is produced by the system scheduling agent. Each log record contains a final summary near the very end. A typical log record as a non-limiting example that could be used follows:

1) Summary Statistics: 8 workers, 24 tasks
2) Average Utility=26.1798%
3) System Parameters:
a) Workers may switch buildings
4) Factor Analysis:

Factors contribute to excess labor (work that could be done by less expensive labor) and to wasted labor (time on a work schedule that could be used for productive work instead). These are both illustrated below.

5) Average factor due to usage over grade—This factor measures the excess labor penalty due to a worker being tasked for a job whose skill requirement is lower than that of the worker. A lower skill worker could do the same job, at lower overall cost to the business.

6) Average factor due to non-productive time—This factor measures the wasted labor penalty due to a worker incurring non-productive time, such as the time required to transport the worker between buildings if his work schedule includes jobs in more than one building at the location.

7) Costing Analysis—This section provides an analysis of the cost of labor and the minimal cost of labor for the jobs assigned to these workers.

The cost numbers below are the total for all workers that have been scheduled for the skill at the location. The costs per hour and per productive hour are the average for all workers that have been scheduled for the skill at the location.

8) Total cost of Burdened labor=$628.2—This is the total labor costs, based on the time on schedule for each worker and their corresponding labor rate.

9) Minimal labor costs—This is the total labor costs minus the costs for excess labor.

10) Excess labor costs—This is the cost for excess labor. In Version minus one, this is due to usage over grade.

11) Excess labor costs due to usage over grade—This is the cost of using the assigned worker for a task where a lower grade worker is acceptable, minus the cost of using that lower grade worker. It is an avoidable, excess cost due to non-ideal scheduling.

12) Wasted labor costs—This is the cost of idle and non-productive time.

13) Wasted labor costs due to non-productive time—This is the cost of labor for the hour(s) of non-productive time, such as the time it takes to transport the worker between buildings if he has jobs on his work schedule for more than one building at the location.

14) Wasted labor costs due to idle time—This is the cost of labor for the hour(s) the worker is not tasked.

15) Nominal Labor cost per hour—This is the cost of labor minus the cost of excess labor divided by the number of productive hours.

16) Minimal Labor cost per productive hour—This is the cost of the productive time on the worker's schedule (i.e., the labor without any non-productive time and using the minimal acceptable skilled worker for each job on the work schedule) divided by the amount of productive time.

17) Labor cost per productive hour—This is the cost of the hours on the work schedule (at the worker's nominal rate) divided by the amount of productive time.

There are several times in the log that the unassigned job/task queue (UJQ) may be shown. This includes at the beginning of the scheduling run, after each algorithm is applied, and after the final statistics. A typical display could include the following:

1 Unassigned Task: Task task12 pri=2 time=150 bldg=2 level=3

1 Unassigned Task: This is the total number of jobs/tasks on the UJQ at this time in the scheduling process.

Task task12 pri=2 time=150 bldg=2 level=3: This the task name, followed by the priority, time (in hundredth's of hours) and skill level required.

There are several times in the log that the worker schedule summary may be shown. This includes at the beginning of the scheduling run, after each algorithm is applied, and after the final statistics. A typical worker schedule summary log record could be as follows:

1) Assignments for Fred (time=870 bldg=1 skill=5)
2) Utility=54.1696%
3) Factor due to usage over grade=0.889231
4) Factor due to non-productive time=0.916923 (0.6 hours)
5) Costing Analysis:
6) Nominal cost per hour=$11
7) Cost per productive hour=$14.7231
8) Minimal cost per productive hour=$10.3846
9) Total cost of Burdened labor=$95.7
10) Minimal cost of Labor (utility=1)=$67.5 (70.5329%)
11) Excess labor costs=$4 (4.17973%)
12) Excess labor costs due to usage over grade (2.5 hrs)=$4 (4.17973%)
13) Wasted labor costs=$24.2 (25.2874%)
14) Wasted labor costs due to non-productive time (0.6 hrs)=$6.6 (6.89655%)
15) Wasted labor costs due to idle time (1.6 hrs)=$17.6 (18.3908%)

There now follows a detailed analysis for each line.

1) Assignments for Fred (time=870 bldg=1 skill=5)—This shows the number of jobs/tasks for this worker, the worker name, the time on the worker's schedule (in hundredths of hours), the building the worker is nominally in, and the worker's skill level.

2) Utility=54.1696%—This is a measure of the "goodness of the worker's schedule. It considers the time on schedule, the priority of jobs, the amount of non-productive and excess time on the schedule, and other factors that measure the schedule's economic value. Utility values range from 0% to 100%.

3) Factor due to usage over grade—This factor measures the excess labor penalty due to the worker being tasked for a job whose skill requirement is lower than that of the worker. A lower skill worker could do the same job, at lower overall cost to the business.

4) Factor due to non-productive time—This factor measures the wasted labor penalty due to the worker incurring non-productive time, such as the time required to transport the worker between buildings if his work schedule includes jobs in more than one building at the location.

5) Costing Analysis—This section provides an analysis of the cost of labor and the minimal cost of labor for the jobs assigned to the worker.

6) Nominal cost per hour—This is the cost of labor for the worker's schedule minus the cost of excess labor divided by the number of productive hours on the schedule.

7) Cost per productive hour—This is the cost of the hours on the work schedule (at the worker's nominal rate) divided by the amount of productive time.

8) Minimal cost per productive hour—This is the cost of the productive time on the worker's schedule (i.e., the labor without any non-productive time and using the minimal acceptable skilled worker for each job on the work schedule) divided by the amount of productive time.

9) Total cost of Burdened labor=$628.2—This is the total labor costs, based on the time on schedule for each worker and their corresponding labor rate.

10) Minimal cost of Labor (utility=1)—This is the total labor costs minus the costs for excess labor.

11) Excess labor costs—This is the cost for excess labor. In version minus one, this is due to usage over grade.

12) Excess labor costs due to usage over grade—This is the cost of using the assigned worker for a task where a lower grade worker is acceptable, minus the cost of using that lower grade worker. It is an avoidable, excess cost due to non-ideal scheduling.

13) Wasted labor costs—This is the cost of idle and non-productive time (NPT).

14) Wasted labor costs due to non-productive time—This is the cost of labor for the hour(s) of non-productive time, such as the time it takes to transport the worker between buildings if he has jobs on his work schedule for more than one building at the location.

15) Wasted labor costs due to idle time—This is the cost of labor for the hour(s) the worker is not tasked.

The individual work schedule detail tasking may be appended to the individual work schedule's summary information. The format is as follows:

Task task211 pri=3 time=50 bldg=1 level=4 Delta utility=0.0361758—This shows the job/task name, the priority value, the time required (in hundredths of hours), the building the task is in, the skill level required and the marginal utility for the job/task (see below).

The optimization process may optionally be shown "in action" as displayed below:

Beginning optimization pass with replacement of lower utility tasks
Starting next optimization pass over free task list
1) Work Schedule for Fred: adding task99983
   removing task911
   (0.0229544)
2) Work Schedule for Fred: adding task99993
   removing task2142
   (0.0398817)
3) Work Schedule for John: adding task99989
   removing task812
   (0.00637209)
4) Work Schedule for Marlene: adding task911
   removing task1
   removing task2
   (0.046)
Starting next optimization pass over free task list
Optimization Pass Done
Optimizing Pass Attempted to assign each free task to a work schedule with replacement of lower utility tasks—weighted sum with k=0.8 Penalizing: grade changes, NPT
Trim Pass: Remove tasks of negative delta utility from work schedules—weighted sum with k=0.5 Penalizing: grade changes, NPT The last two items are the display of the algorithms and utility functions used for the optimizing pass and the trim pass. These are the same displays described above. The rest of this section will describe the unique outputs from the optimization pass, typically run during the rescheduling process.

Beginning optimization pass with replacement of lower utility tasks—This is the delimiter for the beginning of the details of the optimization pass.

Optimization Pass Done—This is the delimiter for the end of the details of the optimization pass.

Starting next optimization pass over free task list—This is shown at the beginning of each sweep over the UJQ. Some of the algorithms used in the optimization pass continue to run until a sweep results in no changes to the work schedules and the UJQ.

Work Schedule for Fred: adding task99983—This shows a task being added onto a work schedule.

removing task911—This shows a task being removed as part of the action of adding the task shown above.

(0.0229544)—This shows the marginal utility of the actions: The utility of Fred's schedule is now 0.0229544 higher than it was before this swap of tasks.

Work Schedule for Fred: adding task99993
removing task2142
(0.0398817)
Work Schedule for John: adding task99989
removing task812
(0.00637209)
Two more examples of tasks being substituted on a work schedule.
Work Schedule for Marlene: adding task911
removing task1
removing task2
(0.046)

Here the task that was removed from Fred's schedule is added to Marlene's schedule, in place of two shorter tasks. This is known in the system of the present invention circles as the "hopscotch effect."

An example of the determination of grade factors and non-productive time follows. Consider a schedule with the following assignments to one worker:

Assignments for Fred (time=870 bldg=1 skill=5)
utility=0.206842
Factor due to usage over grade=0.28
Factor due to non-productive time=0.98875 (0.1 hours)
Costing Analysis:
Nominal cost per hour=$11
Cost per productive hour=$16,925
Total cost of Burdened labor=$135.4
Minimal cost of Labor (utility=1)=$95.7 (70.6795%)
Excess labor costs=$39.7 (29.3205%)
Excess labor costs due to non-productive time (0.1 hrs)=$1.1 (0.812408%)
Excess labor costs due to idle time (0.6 hrs)=$6.6 (4.87445%)
Excess labor costs due to usage over grade (8 hrs)=$32 (23.6337%)
Task task2 pri=3 time=50 bldg=1 level=1 Delta utility=0.012876
Task task1 pri=3 time=50 bldg=1 level=1 Delta utility=0.012876
Task task42 pri=4 time=50 bldg=1 level=1 Delta utility=0.0144659
Task task41 pri=4 time=50 bldg=1 level=1 Delta utility=0.0144659
Task task12 pri=2 time=150 bldg=2 level=1 Delta utility=0.0338683
Task task422 pri=2 time=150 bldg=2 level=1 Delta utility=0.0338683
 5) Average factor due to usage over grade=0.981538
 6) Average factor due to non-productive time=0.979904
 7) Costing Analysis:
 8) Total cost of Burdened labor=$628.2
 9) Minimal labor costs=$624.2 (99.3633%)
10) Excess labor costs=$4 (0.63674%)

11) Excess labor costs due to usage over grade (2.5 hrs)=$4 (0.63674%)
12) Wasted labor costs=$412.2 (65.616%)
13) Wasted labor costs due to non-productive time (0.85 hrs)=$8.35 (1.32919%)
14) Wasted labor costs due to idle time (45.35 hrs)=$403.85 (64.2869%)
15) Nominal Labor cost per hour=$8.94872
16) Minimal Labor cost per productive hour=$8.83333
17) Labor cost per productive hour=$26.175

There now follows a description of this log on a line-by-line basis.

1) Summary Statistics; 8 workers, 24 tasks—This line describes the number of workers and tasks in the partition (one location for one skill).

2) Average Utility=26.1798%—This is the arithmetic mean (the average) of the utilities of the workers in the partition. Utility values range from 0% to 100%.

3) System Parameters—There are several policy level constants that effect the scheduling process.

3a) Workers may switch buildings—One of these is whether workers may incur NPT by having jobs in more than one building in the location.

4) Factor Analysis—The utility value is computed by multiplying the "raw" utility (measure of time and priority on work schedules) by a set of business-meaningful factors. Each factor consists of a multiplier between 0 and 1, which is further moderated by a policy-level constant, which measures the "importance" of the factor to the business. These constants are values between 0 and 1 that are used to attenuate the effect of the factor.

Task task412 pri=3 time=150 bldg=2 level=1 Delta utility=0.038629
Task task22 pri=5 time=150 bldg=2 level=1 Delta utility=0.0481505

NPT Factor: For this example, The NPT user-defined constant (multiplier) is 0.9. Note that Fred has 10 minutes of NPT: this is the distance between building 1 and building 2, according to the configuration file for that site. Therefore his NPT is derived as follows:

$$NPT=(pt-npt*UserNPTFactor)/pt$$

Fred's schedule includes 8 hours (800 hundredths) productive time and 10 hundredths of npt and user defined constant Factor=0.9. Therefore:

$$NPT=(800-(0.9*10))/900=(800-9)/800=791/800=0.98875$$

Grade Factor: The grade factor for this schedule is derived as follows: Fred's UserGradeFactor (multiplier) is 0.9 according to the configuration file. We first compute the raw-Gradefactor and then apply:

$$\text{Grade factor}=1-\text{UserGradeFactor}(1-\text{rawGradeFactor}) \quad (**)$$

The raw grade factor is the sum of (the time on productive jobs X penalty)/time on productive jobs. The time on productive jobs can be seen is 8 hours (800 hundredths). The penalty is 1−(#grades over/maxGrades), where maxGrades is set to 5 in the configuration file. For the first task, time=50, penalty=(1−(4/5))=0.2 so time*penalty=10. Similarly, for the others the values are 10, 10, 10, 30, 30, 30, 30 for a total of 160, so the raw factor is 160/800 or 0.2.

We then apply the equation and compute the grade factor from (**) above:

$$\text{Grade factor}=1(0.9*(1-0.20))=1-(0.9*0.8)=1-0.72=0.28$$

Thus the combined utility (the TRE scheduler rules determine that k=0.5 in this example) is:

$$0.28*0.9975*\text{raw utility}$$

We now compute the raw utility. The raw utility is, for k=0.5, $$0.5A+(1-0.5)B$$

A is % time on schedule, or 800/870=0.91954. B is % time*priority or (50*3+50*3+50*4+50*4+150*2+150*2+150*3+150*5)=2500/(870*5)=2500/4350=0.57471. Thus, $$0.5A+(1-0.5)B=0.5(0.91954)+(1-0.5)$$
$$0.57471=0.45977+0.28736=0.7471$$

Therefore the final utility is:

$$0.28*0.98875*0.7471=0.20684$$

The system and method as described above includes a set of algorithms that schedule workers to jobs. These include a variety of initial scheduling algorithms (e.g., Round Robin) and a rescheduling algorithm (FIG. 14). The rescheduling algorithm is a "hill-climbing" algorithm that swaps jobs between a worker and the Unassigned Job Queue, to maximize the Utility function. This effectively allows the search (through the space of job assignments) to find a local maximum using the hill-climbing algorithm.

Additionally, the algorithms as described all include a constraint-based filter that determines whether a worker was eligible for a job, for example, the worker must have the skill that the job requires and at least the skill level the job requires. The worker should belong to an organization if the job is restricted to that organization. However, these constraints were not used to direct the original scheduling algorithm or the rescheduling algorithm. The constraints were not used to determine the next "move" in the search space that these algorithms represented.

The system, in accordance with non-limiting examples, includes four extensions to these scheduling algorithms. An extension includes the addition of meta-heuristics to guide the rescheduling algorithm so that it does not get stuck at a local maximum. This allows the scheduler to better solve problems that are described by a solution surface that has many local maxima, which is true of most worker scheduling problems.

Another extension also includes the explicit representation of constraints and Utility as objects to be used in the scheduling algorithms. This allows new constraints and utility factors (penalty factors) to be introduced to the scheduler in a timely fashion, including having them being defined by program code (and therefore not requiring that they be defined in advance by a programmer).

Yet another extension includes the addition of a constraint-directed component to the choice of which move to try next in the hill-climbing algorithm. This allows the scheduler to handle problems with several constraints and complex constraints, such as those that are required for handling resources.

Still yet another extension includes the use of these features to extend the scheduler to include considerations of (non-sharable, reusable) resources and wall-clock time. This allows new domains to be scheduled, such as those that require workers to work jobs at specific times (e.g., a lecture that must be attended at 10:00 AM) and to include reasoning about scarce resources (e.g., cranes that are required by some jobs but not others where there may be more jobs to be scheduled simultaneously than there are cranes available). The rest of this document describes these four features in more detail.

Meta-heuristics are algorithms (heuristics) that are used to control a local search. They are typically generic. They are applicable to several domains and are configurable to be used in a given domain. General purpose heuristic methods are used to guide a local search algorithm, such as the hill-climbing algorithm, towards high-utility portions of the search space. They are used in accordance with one non-limiting example to control the hill-climbing algorithm and focus it on regions of the search space that include moves to schedules that are of high utility.

Figure 18:
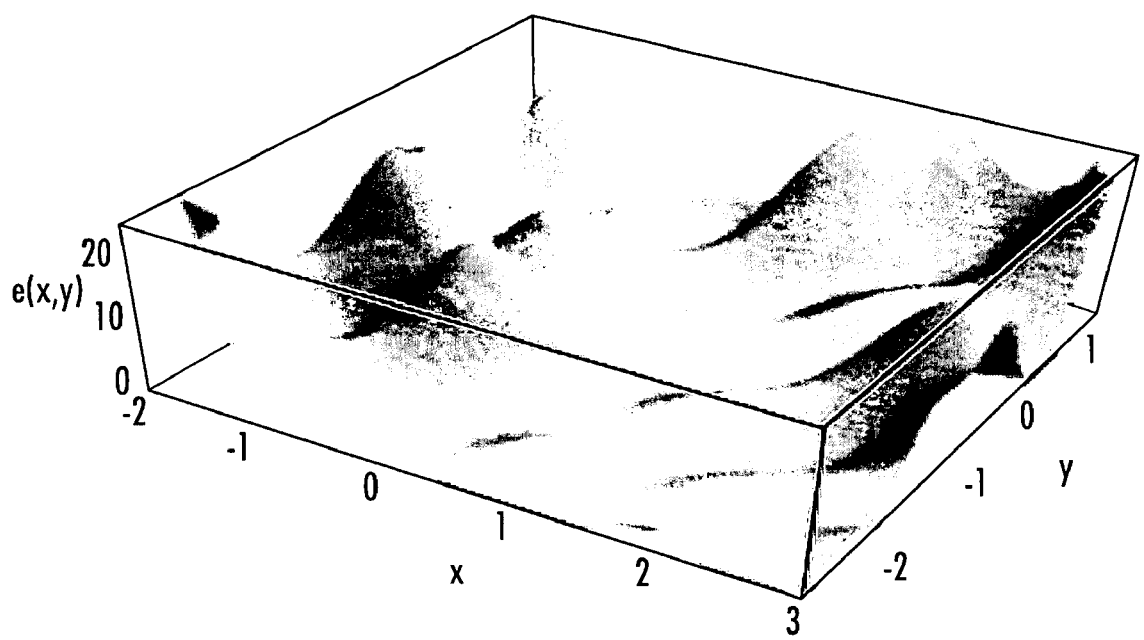
FIG. 18 is a three-dimensional graph showing a surface that has several local maxima.

FIG. 18 shows an example of a surface that has several local maxima. It is not readily apparent which of these is a global maximum.

Figure 19A:
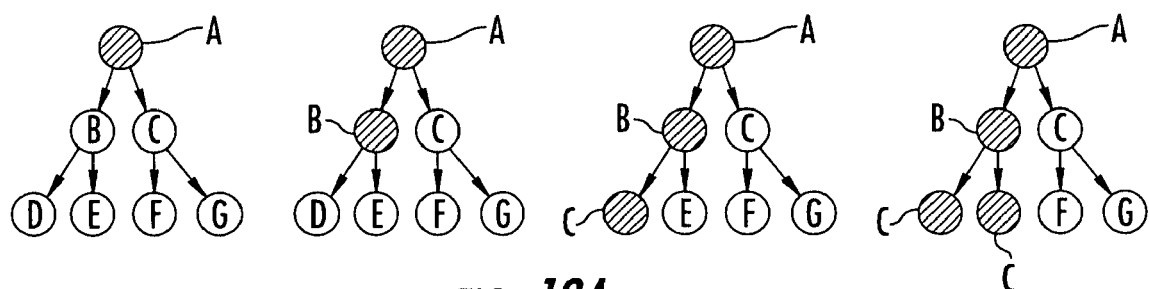
FIGS. 19A and 19B are examples of a search space with two exhaustive search techniques with a depth-first and breadth-first searching.
Figure 19B:
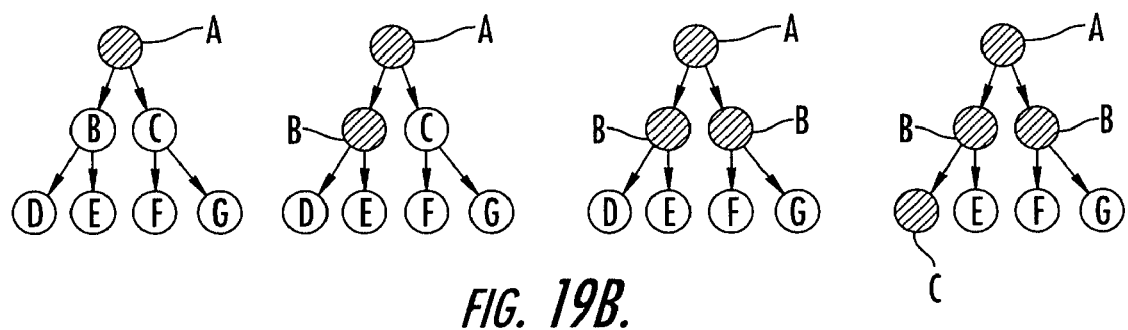

FIGS. 19A and 19B show examples of a search space with two exhaustive search techniques, depth-first and breadth-first searching and indicated by the search levels and search objects listed A, B and C. The scheduler uses a local search guided by constraints instead of one of these exhaustive search techniques.

Each type of meta-heuristic includes a mechanism to escape from local maxima. For example, Iterated Local Search escapes from a local maximum by perturbing (in a principled way) the solution found (the local maximum) and then using it as the starting point for a new local search. A variable Neighborhood Search enlarges the neighborhood used in successive local searches, which makes other maxima reachable in subsequent searches.

There are several meta-heuristics that are applicable in this domain and that will be used to control the scheduling hill-climbing algorithm. These include the various searches that are explained.

1) Tabu Search. This meta-heuristic will be used to keep the search from returning to recently explored portions of the search space, by keeping a "tabu list" of such moves. It will use an aspiration criteria that allows such a move if it results in a set of schedules that have higher utility than any such set previously seen. Memory will be used as well to implement intensification strategies (to explore in more detail portions of the search space that show promise) and diversification strategies (to explore at least to some extent regions of the search space that have not yet been visited).

2) Iterated Local Search. This meta-heuristic runs the hill-climbing algorithm, and then perturbates the solution found, using this new solution as the starting value for another hill-climbing algorithm, and repeats this process until a termination condition (e.g., number of iterations, negligible changes in the returned value from one iteration to the next) holds.

3) Guided Local Search. This meta-heuristic runs the hill-climbing algorithm, and then perturbates the utility function used, penalizing components of the solution that are sub-optimal. It does this by determining a set of features that should be satisfied in the solution (e.g., minimizing non-productive time) and giving those that are not satisfied in the present solution more weight in the utility function during the next iteration. It does this until a termination condition holds (e.g., number of iterations, negligible changes in the returned value from one iteration to the next). The approach takes advantage of the fact that a local optimum of the hill-climbing algorithm for one Utility function may be different than the local optimum generated from the same data (workers, jobs) using a modified Utility function.

4) Variable Neighborhood Search. This meta-heuristic runs the hill-climbing algorithm, and then perturbates the neighborhood to be used in the next iteration. It begins with a restricted neighborhood for the first iteration and uses the results of the iteration to determine a somewhat less restricted neighborhood for the next iteration, which implements a diversification strategy. It does this until a termination condition holds (e.g., number of iterations, negligible changes in the returned value from one iteration to the next).

As noted above, the system can be a process of using a rule-engine to map from the problem space (workers, jobs, etc.) to the solution approach (determination of the initial scheduling algorithm and the rescheduling algorithm to be used and their parameters). This CIP includes using the rule engine to determine which meta-heuristic(s) to use and the parameters to be used for them. An example of such a rule would be:

IF: The ratio of jobs to workers is >Min_Ratio;
AND: There are no jobs that require more than one worker;
AND: Each worker has only one skill;
THEN: Use Tabu search, with a tabu tenure of 2

This tabu search would keep a tabu list where each entry would be the negation of the last move. For example, if the move removed job X from worker Y's schedule and added it to worker Z's schedule, then the tabu list would include an element (ADD X Y) and an element (REMOVE X Z). The "tabu tenure" indicates for how many cycles of local search the move is not allowed. Thus, in this case, the system ensures that any move (such as adding the job to worker Z) is not undone for this many moves.

The Tabu search example also shows the use of intensification and diversification. Intensification is applied by returning to a best solution so far if no improvement has taken place for a given number of iterations. The algorithm assumes there is a counter for the iterations of local search, and a numerical maximum, Int, for the number of iterations to be done without improvement before intensification takes place.

IF: No improvement found in best solution in last Int solutions
THEN: Reset solution to best found so far,
    Reset Intensification counter to 0,
        Continue local search Diversification is applied by restarting the search from a new random assignment if no feasible solution found for a number of iterations, The algorithm assumes there is a numerical maximum, Div, for the number of iterations to be done without improvement before diversification takes place:

IF: No improvement found in best solution in last Div solutions
THEN: Reset solution to random solution,
    Reset Diversification counter to 0,
        Continue local search Constraints and utility can be used in the scheduling algorithm. The architecture enforces a separation of the definition of the model (workers, jobs, skills, locations, constraints, utility function) from that of the search strategy (initial scheduling algorithm, local-search rescheduling algorithm, meta-heuristic). This allows the search procedure to be developed as a generic search, which instantiates specific initial scheduling algorithms, local search algorithms, and meta-heuristics, based on the outputs of the rule engine that maps from the problem space to the solution approach (as described in the original patent and updated to set the type and parameters for the meta-heuristic).

Each constraint object will contain the following capabilities:

1) A function that returns whether the constraint is satisfied.

2) A function that returns the degree to which a constraint is not satisfied.

3) A function that returns the delta between the degree to which the constraint is not satisfied using the present assignments of jobs to workers and the degree to which the constraint would not be satisfied if one or more additional assignments were to be made.

4) A function that returns the delta between the degree to which the constraint is not satisfied using the present assignments of jobs to workers and the degree to which the constraint would not be satisfied if one or more of these assignments were to be changed (e.g., using a move in the hill-climbing algorithm).

Similarly, each utility object will contain the following capabilities:

1) A function that returns the value of the overall utility of the present set of (worker, job) assignments.

2) A function that returns the delta between the overall utility using the present assignments of jobs to workers and the overall utility if one or more additional assignments were to be made.

3) A function that returns the delta between the overall utility using the present assignments of jobs to workers and the overall utility if one or more of these assignments were to be changed (e.g., using a move in the hill-climbing algorithm).

Constraints in the scheduler include both numerical constraints and combinatorial constraints. An example of a numerical constraint would be "The sum of the hours of the jobs on the schedule must not exceed the hours on the schedule." An example of a combinatorial constraint would be "A worker can only have one skill level for a given skill (e.g., cannot be both a junior and a senior electrician)".

For example, the constraint that represents "The sum of the hours of the jobs on the schedule must not exceed the hours on the schedule." would be encapsulated in an object that would check the number of hours on the worker's schedule and the number of hours for the jobs (plus the non-productive time).

1) The function (function 1) that returns whether the constraint is satisfied checks whether the job time+non-productive time is less than or equal to the worker's time available.

2) The function (function 2) that returns the degree to which a constraint is not satisfied would then return the worker's time minus the total of job time and non-productive time.

3) The function (function 3) that returns the delta between the degree to which the constraint is not satisfied using the present assignments of jobs to workers and the degree to which the constraint would not be satisfied if one or more additional assignments were to be made would return the difference between function 2 as applied to the original mix of jobs and function 2 as applied to the new mix of jobs (with the additional assignments).

4) The function (function 4) that returns the delta between the degree to which the constraint is not satisfied using the present assignments of jobs to workers and the degree to which the constraint would not be satisfied if one or more of these assignments were to be changed would return the difference between function 2 as applied to the original mix of jobs and function 2 as applied to the new mix of jobs (with the changed assignments).

These constraint and utility objects may be coded in a general-purpose high-level language (such as Java) or using one of the search-oriented modeling languages that are becoming available.

Constraints can be used to direct the search. These constraint and utility objects will be used by the rescheduling (hill-climbing, local search) algorithms and the meta-heuristics as part of their search strategy. Thus, for example, the present rescheduling algorithm tries to swap jobs between a worker and the unassigned job queue, selecting the one that gives the best delta utility between the present assignments and the swapped assignments. In the constraint-directed search, the value of each such move is determined by calling the utility function's third function mentioned above, subject to the level of constraint violations determined by using the constraint objects fourth method. That is to say, the rescheduling and meta-heuristic components are written using these functions instead of calculating any constraint violations or utility values by hand, as is done in the original system.

These algorithms can continue to be coded in a general-purpose high level language (such as Java) or may be coded in one of the emerging languages for search. The heart of this procedure is to be able to efficiently determine how all constraints and utility functions change as variable assignments change, which can be optimized based on building a (pre-compiled) map that shows the transitive closure of the effect of a given variable assignment on other variables.

As an example, the constraint that represents "The sum of the hours of the jobs on the schedule must not exceed the hours on the schedule" would be used to direct the search away from assignments that violate the constraint. This would be done by searching for assignments that are similar to the one being considered but do not violate this constraint (and other constraints).

Resources and wall clock time can be implemented. Implementing non-sharable, reusable resources is based on keeping track of the usage of the resource in each time period (the resource profile) and implementing constraints to represent any violations on the use of the resource. Thus, for example, if a resource can have six simultaneous users (or there are a set of six identical single-user resources to be used) and if time is quantized (see below) into five minute intervals, then a Constraint object is defined for this resource that shows a maximum allowable use of 6 and the Constraint functions defined above respect the fact that no more than six of these can be allocated in any quantum of time. The penalty value may be set differently for different types of resources, using the above-mentioned mechanisms.

Implementing wall-clock time is done by quantizing time into chunks (e.g., 5 minutes), which is used in support of the resource constraints described above. It also allows the modeling language to include constructs that restrict the scheduling of jobs to using a set of relationships that extend the capability to describe the temporal relationship between different jobs. The original patent defined the precedes relationship "job x must finish before job y may start". This CIP defines other types of relationships may hold, amongst others:

1) Job x and job y may not overlap (but may be sequenced either with x preceding y or y preceding x).

2) Job x must finish at least z quanta of time before job y starts.

Additionally, constraints may be placed on the start or end time of individual jobs. These relationships include:

1) Job x must start at a given time.
2) Job x must not start until at least a given time.
3) Job x must end at a given time.
4) Job x must end by a given time.

Figure 20:
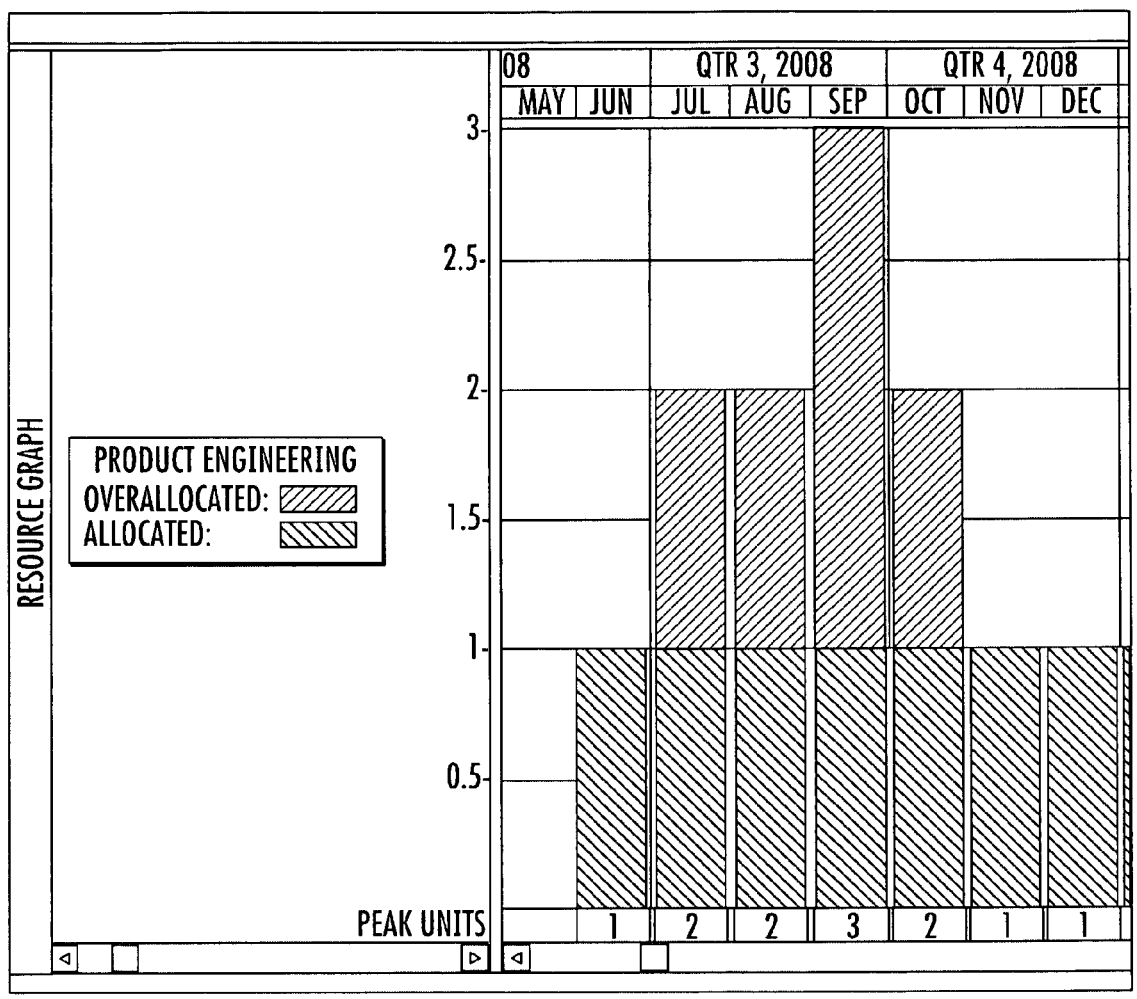
FIG. 20 is a graph showing a resource allocation profile in accordance with a non-limiting example.

Resource profiles are examples of complex constraints. The idea is that, at the time that a job is to start, the resource profile will be examined to ensure that no resources are being excessively allocated. That is, the allocation of the resource to jobs that are scheduled at the same time must not exceed the available amount of the resource. An example of a resource usage profile is shown in FIG. 20. Note that, according to this figure, the resource is being over-allocated for part of the scheduled time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for managing mobile workers, comprising:
   a plurality of clients, each corresponding to a mobile worker to be managed, each client including a communications device for receiving messages detailing work schedules for tasks to be performed as jobs on target objects in a job environment;
   a server in communication with each of said plurality of clients, said server including a database having a plurality of target objects that are classified corresponding to facilities assets to be worked on by a mobile worker, and attributes of each target object, including any tasks to be performed on target objects, said server including a rule engine operative for determining algorithms based on a utility function for partitioned jobs and mobile workers wherein different algorithms are selected and used for different partitions to schedule jobs and mobile workers in selected different regions, wherein an algorithm is selected based on a weighted sum that is calculated from a possible number of work schedules, jobs and mobile workers for each partition, wherein a selected policy for a job environment determines how mobile workers, jobs and work schedules are partitioned, wherein said rule engine is operative with a scheduling algorithm to map from a problem space for partitioned jobs and mobile workers to a solution to schedule jobs and mobile workers in selected different regions, wherein a selected policy for a job environment determines how mobile workers, jobs and work schedules are partitioned, said server further comprising a plurality of system agents that automate supervision including work planning, scheduling, dispatching, stores management, job state management and end-of-shift management, and wherein the rule engine is operative to control the scheduling algorithm using heuristics comprising at least one of a tabu search, iterated local search, guided local search and variable neighborhood search to focus a search space to regions for moving to schedules of high utility; and
   a communications device operative with said server for communicating any determined work schedules and jobs as messages to said clients.

2. The system according to claim 1, wherein said tabu search is operative to prevent searching recently explored portions of the search space.

3. The system according to claim 1, wherein said iterated local search perturbates a solution for a new solution as a starting value for another scheduling algorithm.

4. The system according to claim 1, wherein said guided local search perturbates a utility function to penalize suboptimal components of a solution.

5. The system according to claim 1, wherein the variable neighborhood search perturbates a neighborhood search to be used in a next iteration.

6. The system according to claim 1, wherein the scheduling algorithm is operative with numerical and combinatorial constraint objects allowing searching from a general search to a more specific search.

7. The system according to claim 6, and further comprising a constraint object for maintaining time usage of a constraint object.

8. The system according to claim 1, wherein said server further comprises a simulator database and simulation module that queries the simulator database to determine the effects of a policy change on planning and scheduling of jobs and workers using different algorithms and partitions.

9. The system according to claim 1, wherein said server further comprises an event bus operative with the system agents and database, wherein said system agents communicate across the event bus with the database and rule engine for implementing system agent functions based on events passed over the event bus.

10. The system according to claim 1, wherein said scheduling algorithm comprises a rescheduling algorithm.

11. A system for managing mobile workers, comprising:
    a plurality of clients, each corresponding to a mobile worker to be managed, each client including a communications device for receiving messages detailing work schedules for tasks to be performed as jobs on target objects in a job environment;
    a server in communication with each of said plurality of clients, said server including a database having a plurality of target objects that are classified corresponding to facilities assets to be worked on by a mobile worker, and attributes of each target object, including any tasks to be performed on target objects, said server including a rule engine operative for determining algorithms based on a utility function for partitioned jobs and mobile workers wherein different algorithms are selected and used for different partitions to schedule jobs and mobile workers in selected different regions, wherein an algorithm is selected based on a weighted sum that is calculated from a possible number of work schedules, jobs and mobile workers for each partition, wherein a selected policy for a job environment determines how mobile workers, jobs and work schedules are partitioned, wherein said rule engine is operative with a scheduling algorithm for partitioned jobs and mobile workers to schedule jobs and mobile workers in selected different regions, wherein a selected policy for a job environment determines how mobile workers, jobs and work schedules are partitioned, said server further comprising a plurality of system agents that automate supervision including work planning, scheduling, dispatching, stores management, job, state management and end-of-shift management, and wherein the rule engine is operative to control the scheduling algorithm using heuristics comprising at least one a tabu search, iterated local search, guided local search and variable neighborhood search and a policy database for storing data relating to selected policy for a job environment and how the mobile workers, jobs and work schedules are partitioned; and
    a communications device operative with said server for communicating any determined work schedules and jobs to said clients.

12. The system according to claim 11, wherein said tabu search is operative to prevent searching recently explored portions of the search space.

13. The system according to claim 11, wherein said iterated local search perturbates a solution for a new solution as a starting value for another scheduling algorithm.

14. The system according to claim 11, wherein said guided local search perturbates a utility function to penalize suboptimal components of a solution.

15. The system according to claim 11, wherein the variable neighborhood search perturbates a neighborhood search to be used in a next iteration.

16. The system according to claim 11, wherein the scheduling algorithm is operative with numerical and combinatorial constraint objects allowing searching from a general search to a more specific search.

17. The system according to claim 16, and further comprising a constraint object for maintaining time usage of a constraint object.

18. The system according to claim 11, wherein said server further comprises a simulator database and simulator module that queries the simulator database to determine the effects of a policy change on planning and scheduling of jobs and workers using different algorithms and partitions.

19. The system according to claim 11, wherein said server further comprises an event bus operative with the system agents and database, wherein said system agents communicate across the event bus with the database and rule engine for implementing system agent functions based on events passed over the event bus.

20. The system according to claim 11, wherein said scheduling algorithm comprises a rescheduling algorithm.

* * * * *